United States Patent
Giurgiutiu et al.

(10) Patent No.: US 10,900,934 B2
(45) Date of Patent: Jan. 26, 2021

(54) ACOUSTIC BLACK HOLE FOR SENSING APPLICATIONS

(71) Applicant: University of South Carolina, Columbia, SC (US)

(72) Inventors: Victor Giurgiutiu, Columbia, SC (US); Erik Frankforter, Columbia, SC (US)

(73) Assignee: University of South Carolina, Columbia, SC (US)

( * ) Notice: Subject to any disclaimer, the term of this patent is extended or adjusted under 35 U.S.C. 154(b) by 194 days.

(21) Appl. No.: 15/951,566

(22) Filed: Apr. 12, 2018

(65) Prior Publication Data

US 2018/0335406 A1 Nov. 22, 2018

Related U.S. Application Data

(60) Provisional application No. 62/506,705, filed on May 16, 2017.

(51) Int. Cl.
*G01N 29/12* (2006.01)
*G10K 11/172* (2006.01)
(Continued)

(52) U.S. Cl.
CPC ............. *G01N 29/32* (2013.01); *G01N 29/07* (2013.01); *G01N 29/11* (2013.01); *G01N 29/12* (2013.01);
(Continued)

(58) Field of Classification Search
CPC ........ G01N 29/32; G01N 29/12; G01N 29/07; G01N 29/11; G01N 29/221;
(Continued)

(56) References Cited

U.S. PATENT DOCUMENTS

| | | | | |
|---|---|---|---|---|
| 5,823,467 A | * | 10/1998 | Mathur | ..................... B64C 1/12 244/1 N |
| 6,459,492 B1 | * | 10/2002 | Hercher | .................. G01D 5/28 250/559.29 |

(Continued)

FOREIGN PATENT DOCUMENTS

| | | | | |
|---|---|---|---|---|
| DE | 102015100442 | | * | 7/2016 |
| DE | 102015100442 A1 | * | 7/2016 | ............. G10K 11/16 |

OTHER PUBLICATIONS (Smart Materials and Structures, Broadband energy harvesting using acoustic black hole structural tailoring, 2014 Smart Mater. Structures. 23 065021). (Year: 2014).*

(Continued)

*Primary Examiner* — Jacques M Saint Surin
(74) *Attorney, Agent, or Firm* — Dority & Manning, P.A.

(57) ABSTRACT

Structural health monitoring systems and methods are described that incorporate one or more acoustic black holes in a sensing capacity. The acoustic black hole provides low- or no-reflection capabilities combined with high displacement of an edge upon excitation. The sensor can be utilized to differentiate in-plane acousto-ultrasonic wave excitations from out-of-plane excitations as well as to separate the in-plane and out-of-plane components of an excitation acousto-ultrasonic wave. Sensors can incorporate features such as mode selectivity, omnidirectional sensing, frequency tunability, quasi-static strain insensitivity, and mechanical amplification.

19 Claims, 19 Drawing Sheets

(51) Int. Cl.
G01N 29/07 (2006.01)
G01N 29/24 (2006.01)
G01N 29/11 (2006.01)
G01N 29/22 (2006.01)
G10K 11/16 (2006.01)
G10K 11/02 (2006.01)
G01N 29/32 (2006.01)

(52) U.S. Cl.
CPC ....... *G01N 29/221* (2013.01); *G01N 29/2487* (2013.01); *G10K 11/02* (2013.01); *G10K 11/16* (2013.01); *G10K 11/172* (2013.01); *G01N 2291/023* (2013.01); *G01N 2291/0258* (2013.01)

(58) Field of Classification Search
CPC ......... G01N 29/2487; G01N 2291/023; G01N 2291/0258; G10K 11/172; G10K 11/16; G10K 11/02
USPC .......................................................... 73/594
See application file for complete search history.

(56) References Cited

U.S. PATENT DOCUMENTS

| 6,713,743 | B2 | 3/2004 | Kim et al. | |
|---|---|---|---|---|
| 7,031,886 | B1* | 4/2006 | Hargreaves | G06F 3/0418 375/350 |
| 8,701,494 | B1* | 4/2014 | Saxena | G01N 29/11 73/632 |
| 2013/0071251 | A1* | 3/2013 | Relancio | F04D 29/666 416/223 R |
| 2013/0333472 | A1* | 12/2013 | Georgeson | G01N 21/1702 73/584 |
| 2014/0082775 | A1 | 3/2014 | Zahl | |
| 2014/0113828 | A1* | 4/2014 | Gilbert | H01L 39/126 505/100 |
| 2016/0282308 | A1* | 9/2016 | Mofakhami | B64D 45/00 |

OTHER PUBLICATIONS

Smart Materials and Structures Geometrical acoustics approximation for Rayleigh and Lamb waves, Krylov (Year: 2012).*

V. Denis, A. Pelat, and F. Gautier, "Scattering effects induced by imperfections on an acoustic black hole placed at a structural waveguide termination," J. Sound Vib., vol. 362, pp. 56-71, 2016.

A. M. Lomonosov, S.-L. Yan, B. Han, H.-C. Zhang, and Z.-H. Shen, "Orbital-type trapping of elastic Lamb waves," Ultrasonics, vol. 64, pp. 58-61, 2016.

D. J. O'Boy and V. V. Krylov, "Vibration of a rectangular plate with a central power-law profiled groove by the Rayleigh—Ritz method," Appl. Acoust., vol. 104, pp. 24-32, 2016.

B. E. Anderson, M. C. Remillieux, P.-Y. Le Bas, T. J. Ulrich, and L. Pieczonka, "Ultrasonic radiation from wedges of cubic profile: Experimental results," Ultrasonics, vol. 63, pp. 141-146, 2015.

V. Denis, F. Gautier, A. Pelat, and J. Poittevin, "Measurement and modelling of the reflection coefficient of an Acoustic Black Hole termination," J. Sound Vib., vol. 349, pp. 67-79, 2015.

P. Feurtado and S. Conlon, "Investigation of boundary-taper reflection for acoustic black hole design," Noise Control Eng. J., vol. 63, No. 5, pp. 460-466, 2015.

A. Ouahabi, V. Krylov, and D. O'Boy, "Experimental investigation of the acoustic black hole for sound absorption in air," in The 22nd International Congress on Sound and Vibration, 2015, No. July, pp. 1-8.

A. Ouahabi, V. Krylov, and D. O'Boy, "Investigation of the acoustic black hole termination for sound waves propagating in cylindrical waveguides," in 44th International Congress and Exposition on Noise Control Engineering, 2015, No. August.

H. Zhu and F. Semperlotti, "Phononic thin plates with embedded acoustic black holes," Phys. Rev. B, vol. 91, No. 10, p. 104304, 2015.

H. Zhu and F. Semperlotti, "Design of embedded acoustic lenses in plate-like structures based on periodic acoustic black holes," in Proc. SPIE 9435, Sensor and Smart Structures Technologies for Civial, Mechanical, and Aerospace Systems, 2015, vol. 9435, p. 94350K.

E. P. Bowyer and V. V Krylov, "Experimental investigation of damping flexural vibrations in glass fibre composite plates containing one- and two-dimensional acoustic black holes," Compos. Struct., vol. 107, pp. 406-415, 2014.

E. P. Bowyer and V. V. Krylov, "Damping of flexural vibrations in turbofan blades using the acoustic black hole effect," Appl. Acoust., vol. 76, pp. 359-365, 2014.

S. C. Conlon, J. B. Fahnline, F. Semperlotti, and P. a Feurtado, "Enhancing the low frequency vibration reduction performance of plates with embedded Acoustic Black Holes," in 43rd International Congress on Noise Control Engineering, 2014.

V. Denis, A. Pelat, F. Gautier, and B. Elie, "Modal Overlap Factor of a beam with an acoustic black hole termination," J. Sound Vib., vol. 333, No. 12, pp. 2475-2488, 2014.

V. Denis, "Vibration damping in beams using the acoustic black hole effect," 2014.

P. A. Feurtado, S. C. Conlon, and F. Semperlotti, "A normalized wave number variation parameter for acoustic black hole design," J. Acoust. Soc. Am., vol. 136, No. 2, pp. EL148-EL152, 2014.

V. Krylov, "Acoustic black holes: recent developments in the theory and applications," IEEE Trans. Ultrason. Ferroelectr. Freq. Control, vol. 61, No. 8, pp. 1296-1306, 2014.

C. J. Naify, T. P. Martin, C. N. Layman, M. Nicholas, A. L. Thangawng, D. C. Calvo, and G. J. Orris, "Underwater acoustic omnidirectional absorber," Appl. Phys. Lett., vol. 104, No. 7, p. 073505, 2014.

M. Remillieux, B. Anderson, P. Le Bas, and T. Ulrich, "Improving the Air Coupling of Bulk Piezoelectric Transducers with Wedges of Power-Law Profiles: A Numerical Study," Ultrasonics, vol. 54, No. 5, pp. 1409-1416, 2014.

L. Zhao, S. C. Conlon, and F. Semperlotti, "Broadband energy harvesting using acoustic black hole structural tailoring," Smart Mater. Struct., vol. 23, No. 6, p. 065021, 2014.

E. P. Bowyer, D. J. O'Boy, V. V. Krylov, and F. Gautier, "Experimental investigation of damping flexural vibrations in plates containing tapered indentations of power-law profile," Appl. Acoust., vol. 74, No. 4, pp. 553-560, 2013.

E. P. Bowyer, D. J. O'Boy, V. V. Krylov, and F. Gautier, "Damping of flexural vibrations in plates containing ensembles of tapered indentations of power-law profile," in Proceedings of Meetings on Acoustics, 2013, vol. 18, pp. 030003.

E. Bowyer and V. Krylov, "Experimental Investigations into the Acoustic Black Hole Effect and its Applications for reduction of Flexural Vibrations and Structure-Borne Sound," in Proceedings of the AIA-DAGA 2013 Conference on Acoustics, 2013.

V. Denis and A. Pelat, "Increasing the modal overlap factor of a beam using acoustic black hole effect," in 11th International Conference on Vibration Problems, 2013.

V. Krylov and E. Bowyer, "Acoustic Black Holes : a New Approach to Vibration Damping in Light-Weight Structures," in Proceedings of the Institute of Acoustics, 2013, vol. 35, No. 1, pp. 184-191.

E. P. Bowyer, D. J. O'Boy, V. V. Krylov, and J. L. Horner, "Effect of geometrical and material imperfections on damping flexural vibrations in plates with attached wedges of power law profile," Appl. Acoust., vol. 73, No. 5, pp. 514-523, 2012.

E. P. Bowyer and V. V. Krylov, "Sound radiation of rectangular plates containing tapered indentations of power-law profile," in Proceedings of Meetings on Acoustics, 2012, vol. 18, No. 1, p. 030002.

E. P. Bowyer, P. Nash, and V. V. Krylov, "Damping of flexural vibrations in glass fibre composite plates and honeycomb sandwich panels containing indentations of power-law profile," in Proceedings of Meetings on Acoustics, 2012, vol. 18, No. 1, p. 030004.

(56) References Cited

OTHER PUBLICATIONS

E. Bowyer, V. Krylov, and D. O'Boy, "Damping of flexural vibrations in rectangular plates by slots of power-law profile," in Proceedings of the Acoustics 2012 Nantes Conference, 2012, pp. 2193-2198.
E. Bowyer, J. Lister, V. Krylov, and D. O'Boy, "Experimental study of damping flexural vibrations in tapered turbofan blades," in Proceedings of the Acoustics 2012 Nantes Conference, 2012.
E. Bowyer, D. O'Boy, and V. Krylov, "Damping of flexural vibrations in composite plates and panels containing one- and two-dimensional acoustic black holes," in Proceedings of the Acoustics 2012 Nantes Conference, 2012, pp. 2199-2204.
J. Cuenca, A. Pelat, F. Gautier, and N. Ferguson, "Improving the acoustic black hole effect for vibration damping in one-dimensional structures," in Proceedings of the Acou, 2012, pp. 2189-2191.
V. V Krylov, "Acoustic black holes and their applications for vibration damping and sound absorption," in Proceedings of the International Conference on Noise and Vibration Engineering ISMA 2012, 2012, pp. 933-944.
V. V Krylov, "Geometric acoustics approximation for Rayleigh and Lamb waves," in The Ninth International Conference on Condition Monitoring and Machinery Failure Prevention Technologies, 2012.
J. Cuenca, A. Pelat, and F. Gautier, "Vibration damping in polygonal plates using the acoustic black hole effect: model based on the image source method," in 20ème Congrès Français de Mécanique, 2011.
V. B. Georgiev, J. Cuenca, F. Gautier, L. Simon, and V. V. Krylov, "Damping of structural vibrations in beams and elliptical plates using the acoustic black hole effect," J. Sound Vib., vol. 330, No. 11, pp. 2497-2508, 2011.
D. J. O'Boy, E. P. Bowyer, and V. V Krylov, "Point mobility of a cylindrical plate incorporating a tapered hole of power-law profile," J. Acoust. Soc. Am., vol. 129, No. 6, pp. 3475-3482, 2011.
V. B. Georgiev, J. Cuenca, F. Gautier, and L. Simon, "Vibration reduction of beams and plates using Acoustic Black Hole effect," in 39th International Congress and Exposition on Noise Control Engineering, 2010.
V. B. Georgiev, J. Cuenca, M. Moleron Bermudez, F. Gautier, and L. Simon, "Recent progress in vibration reduction using Acoustic Black Hole effect," in 10ème Congrès Français d'Acoustique, 2010.

D. J. O'Boy, V. V. Krylov, and V. Kralovic, "Damping of flexural vibrations in rectangular plates using the acoustic black hole effect," J. Sound Vib., vol. 329, No. 22, pp. 4672-4688, 2010.
G. Cardone, S. A. Nazarov, and J. Taskinen, "'Absorption' effect for elastic waves by the beak-shaped boundary irregularity," Dokl. Phys., vol. 54, No. 3, pp. 146-150, 2009.
V. Kralovic, "Damping of flexural vibrations in tapered rods of power-law profile: experimental studies," Proc. Inst. Acoust., vol. 29, No. 5, pp. 66-73, 2007.
V. Kralovic and V. Krylov, "Some new methods of damping impact-induced vibrations in badminton racquets," Proc. Inst. Acoust., vol. 30, No. 2, pp. 155-162, 2007.
V. V. Krylov and R. E. T. B. Winward, "Experimental investigation of the acoustic black hole effect for flexural waves in tapered plates," J. Sound Vib., vol. 300, No. 1, pp. 43-49, 2007.
V. Krylov, "Propagation of plate bending waves in the vicinity of one- and two-dimensions acoustic 'black holes,'" in Proceedings of the ECCOMAS Thematic Conference on Computation Methods in Structural Dynamics and Earthquake Engineering, 2007.
V. V Krylov, "Damping of resonant vibrations utilising the acoustic black hole effect," in Proceedings of the International Conference on Noise and Vibration Emerging Technologies, 2005.
V. Krylov and R. E. T. B. Winward, "Experimental evidence of the acoustic black hole effect for flexural waves in tapered plates," in Proceedings of the Twelfth International Congress on Sound and Vibration, 2005.
V. V. Krylov, "New type of vibration dampers utilising the effect of acoustic 'black holes,'" Acta Acust. United with Acust., vol. 90, No. 5, pp. 830-837, 2004.
V. Krylov and F. Tilman, "Acoustic 'Black Holes' for Flexural Waves as Effective Vibration Dampers," J. Sound Vib., vol. 274, No. 3, pp. 605-619, 2004.
V. Krylov, "Acoustic 'black holes' for flexural waves and their potential applications," in Proceedings of the Institute of Acoustics Spring Conference, 2002, pp. 25-27.
M. A. Mironov and V. V. Pislyakov, "One-dimensional acoustic waves in retarding structures with propagation velocity tending to zero," Acoust. Phys., vol. 48, No. 3, pp. 347-352, 2002.
V. Krylov, "Localized acoustic modes of a quadratic solid wedge," Moscow Univ. Phys. Bull., vol. 45, No. 6, pp. 65-69, 1990.
M. A. Mirinov, "Propagation of a flexural wave in a plate whose thickness decreases smoothly to zero in a finite interval," Sov. physics. Acoust., vol. 34, No. 3, pp. 318-319, 1988.

* cited by examiner 6.0 kHz 10.0 kHz 10.5 kHz 19.1 kHz 16.0 kHz 17.5 kHz

ACOUSTIC BLACK HOLE FOR SENSING APPLICATIONS

CROSS REFERENCE TO RELATED APPLICATION

This application claims filing benefit of U.S. Provisional Patent Application Ser. No. 62/506,705 having a filing date of May 16, 2017, which is incorporated herein by reference for all purposes.

FEDERAL RESEARCH STATEMENT

J0001.11 This invention was made with Government support under Grant No. ONR N000141512102, awarded by the Office of Naval Research. The Government has certain rights in the invention.

BACKGROUND

Structural health monitoring (SHM) is generally defined as the process of implementing a damage detection and characterization strategy for engineering structures. SHM falls within the broader classification of nondestructive evaluation (NDE) and can be used to determine the state of a structure by use of sensors that are either permanently or temporarily embedded in or otherwise attached to the structure. SHM can be performed with either a passive or an active system. Passive examination uses sensors that "listen" but do not interact with the structure. As such, the passive method does not generally provide direct measurement of damage presence and size, but the general health state of the structure can be inferred from analysis of the response of passive sensors. Active examination utilizes proactive interrogation of sensors embedded in/on a structure to detect damage extent and thereby determine a more detailed analysis. Methods used for active SHM often utilize generation of ultrasonics, eddy currents, etc. to generate a sensor response.

Acoustic black holes (ABH) include tapers formed by two curves that approach a zero interior angle at their interface, e.g., a body in the shape of a wedge. The taper-shaped body leads to the slowing of vibrational wave speed as the thickness of the wedge gradually diminishes. As the thickness of the edge approaches zero the vibrational wave speed approaches zero and there will be little or no reflection of the vibrational wave from the edge. As such, the taper functions as an "acoustic black hole," with the result that vibrational energy collects at the edge portion of the taper where thickness becomes zero. These structures have shown great promise in facilitating energy damping, for instance in sound insulating or in damping vibration in a fluid flow.

What are needed in the art are improved SHM systems and methods that can monitor a structure while providing information with regard to location and severity of damage due to, e.g., impact events. For instance, a system that can sense both in-plane and out-of-plane vibrations in/on a structure would be of great benefit. Moreover, a system that can separate in-plane and out-of-plane components of an acousto-ultrasonic wave traveling on/in a structure would be of great benefit.

SUMMARY

Aspects and advantages of the invention will be set forth in part in the following description, or may be obvious from the description, or may be learned through practice of the invention.

In one embodiment disclosed is a system for monitoring a structure that includes a sensor and a motion detector in communication with the sensor. The sensor includes a base for attachment to a structure and an ABH that can exhibit high displacement at an essentially one- or two-dimensional edge upon interaction between the sensor and an incoming acousto-ultrasonic wave transmitted from a structural surface to the sensor attached to the surface. The motion detector can be either a contact or non-contact detector that can register the vibrational response of the ABH edge to an incoming excitation wave.

A sensor can include a single or multiple ABHs and a system can operate in either a passive or active mode. For instance, a system can include a signal generator in communication with the sensor(s) that can interrogate the sensors continually or periodically in an active mode. The sensor response as determined at an ABH edge or point can provide information with regard to the health of the structure to which it is attached.

Methods for utilizing the system are also described. For instance, a method can include monitoring a sensor attached to the surface of a structure, the sensor including an ABH and the monitoring including detecting and analyzing vibrations of the ABH edge or point. The analysis can include determination of the planar nature of an acousto-ultrasonic wave passing in/on the structure that has led to the ABH vibrational response. For instance, the analysis can include determination that the incoming wave is either in-plane or out-of-plane of the surface. In one embodiment, the analysis can include demodulation of the system response (for instance in those embodiments in which the system includes multiple ABH in a single system) in order to differentiate in-plane components and out-of-plane components of the acousto-ultrasonic stimulus to the system.

These and other features, aspects and advantages of the present disclosure will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to SHM systems and methods that incorporate one or more ABHs in a sensor for acousto-ultrasonic waves passing in/on a structure. The low or no reflection capabilities of an ABH combined with the high displacement of the ABH edge upon excitation combine to provide excellent sensor response in either a resonance mode or a broadband frequency mode. In particular, the low/no wave reflection of the ABH can provide a route to differentiate in-plane acousto-ultrasonic wave excitations from out-of-plane excitations. In fact, in some embodiments, analysis of the sensor output can be demodulated to separate the in-plane and out-of-plane components of an excitation acousto-ultrasonic wave. As such, the ABH-based systems and methods can provide a highly sensitive and improved response as compared to existing sensors. In some embodiments, disclosed sensors can incorporate beneficial features such as mode selectivity, omnidirectional sensing, frequency tunability, quasi-static strain insensitivity, and mechanical amplification. Moreover, the sensing systems can provide improved SHM with a low space and weight requirement. This can be of great benefit, particularly when considering utilization of the systems with vehicles such as aircraft, for which space and weight usage can come at a high efficiency cost.

Figure 1:
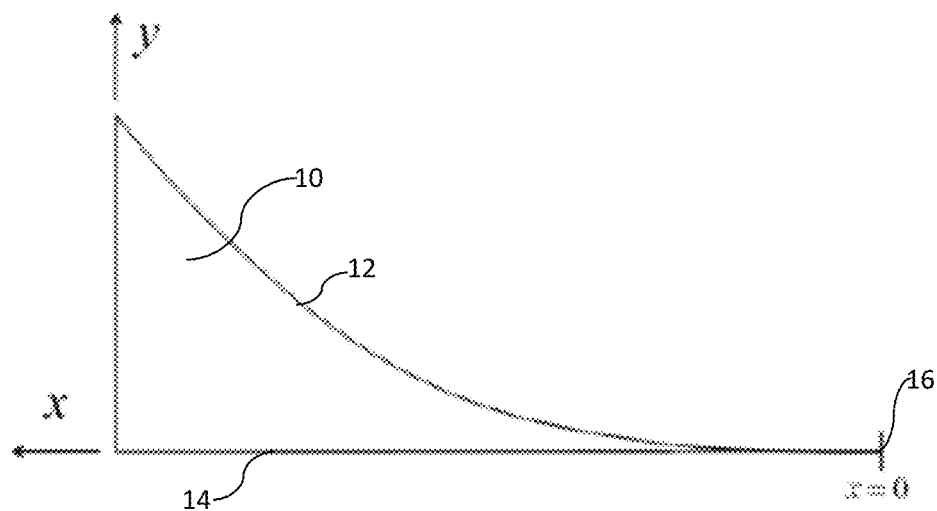
FIG. 1 schematically illustrates an ABH formed from the intersection of a power law profile with a straight line.

FIG. 1 illustrates an ABH as known in the art as may be incorporated into a sensor. As shown, the ABH 10 includes a tapered side 12 that, in this embodiment, follows a power law profile in which the shape of the side 12 is described by the following function:

$$f(x)=cx^m$$

wherein m is a positive rational number and c is a constant.

As shown, the tapered side 12 approaches the second side 14 of the ABH 10 such that the tip 16 at the intersection of the two sides 12, 14 at x=0 approaches a zero-thickness.

Figure 2:
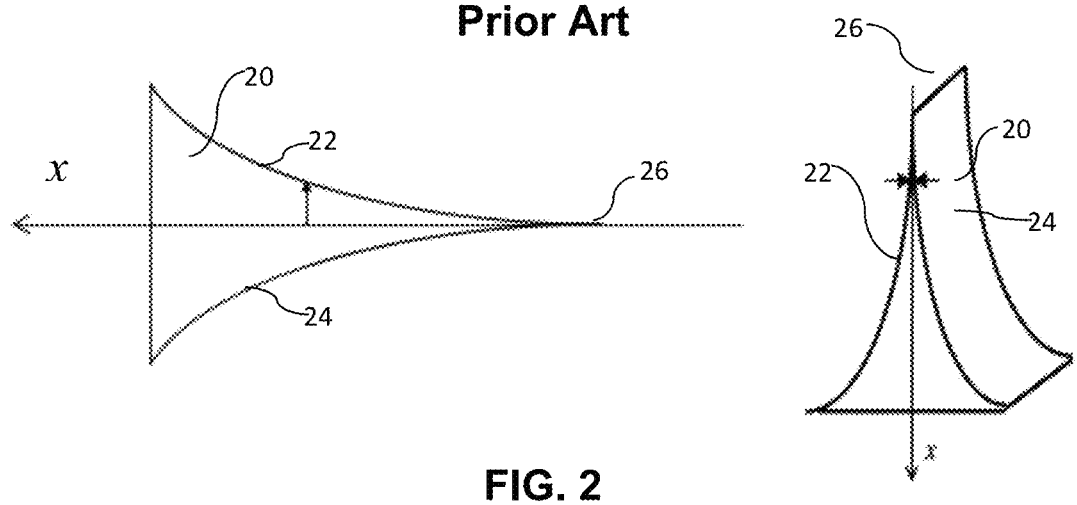
FIG. 2 schematically illustrates an ABH formed from the intersection of two power law profiles.

In the embodiment of FIG. 1, the second side 14 of the ABH describes a straight line, as shown, but this is not a requirement of an ABH. For example, FIG. 2 illustrates another ABH 20 as known in the art in both a side view (left) and a perspective view (right) in which the intersecting sides 22, 24 are both described by a power law function (Krylov, V., and Tilman F. "Acoustic 'black holes' for flexural waves as effective vibration dampers." Journal of Sound and Vibration 274.3 (2004): 605-619). As shown, the edge 26 approaches a zero-thickness at the intersection of the first and second sides 22, 24.

The taper of the ABH is not limited to curved sides that are defined by a power law function, and an ABH can be formed by two curves of any shape as long as the intersection of the two curves approaches a zero or a small acute angle. For example, the edge can be formed by the intersection of two curves that are defined by power law profiles, semi-elliptical profiles, straight lines, or combinations thereof.

Figure 3:
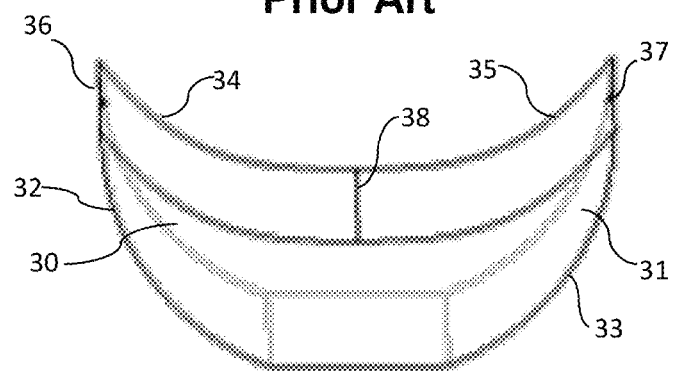
FIG. 3 schematically illustrates a sensor including two ABHs about a line of symmetry.

By way of example, FIG. 3 illustrates a sensor that includes a first ABH 30 and a second ABH 31. The ABH 30 includes an edge 36 defined at the intersection of two curves 32, 34 and the ABH 31 includes an edge 37 defined at the intersection of two curves 33, 35. The curves 32, 34 that define the edge 36 can be the same or different from one another and can be described by any suitable function, as can the curves 33, 35 that define the edge 37. Moreover, in this embodiment, in which a sensor includes multiple ABH, the curves that define each ABH can be the same or different from one another. For instance, the curves 32, 33, which define the lower sides of ABH 30 and ABH 31, respectively, can be the same or different from one another and the curves

34, 35, which define the opposite or upper sides of ABH 30 and ABH 31, respectively, can be the same or different from one another.

In any case, the ABH geometry is such that it has a diminishing or zero-reflection response to an acousto-ultrasonic wave for the case of a zero-thickness taper, though in practice the edge will have a small but finite thickness with some reflection. The thickness of an edge can generally depend upon the material of formation used to form the edge. However, in general, an edge can have a thickness as defined between the intersection of the two curves that form the edge of about 500 micrometers (µm) or less, for instance about 100 µm or less, about 10 µm or less, or about 1 µm or less in some embodiments. For instance, in some embodiments, the thickness of the ABH edge can be on the nanometer scale, for instance about 800 nm or less, or about 500 nm or less, e.g., from about 200 nm to about 500 µm, or from about 500 nm to about 1 µm, in some embodiments.

Figure 7:
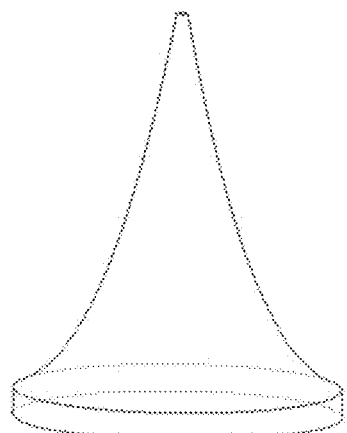
FIG. 7 presents a perspective view of a single point ABH sensor.

As shown in FIGS. 1, 2, and 3, the ABH edge may be essentially one dimensional. In other embodiments, the edge may be essentially two-dimensional, in which the curves forming the edge are three-dimensional rather than planar. In another embodiment, the termination of the ABH may be a point, in which the curves forming the termination may narrow to a cusp from two directions to terminate in a diminishingly small point (e.g., FIG. 7).

Figure 4:
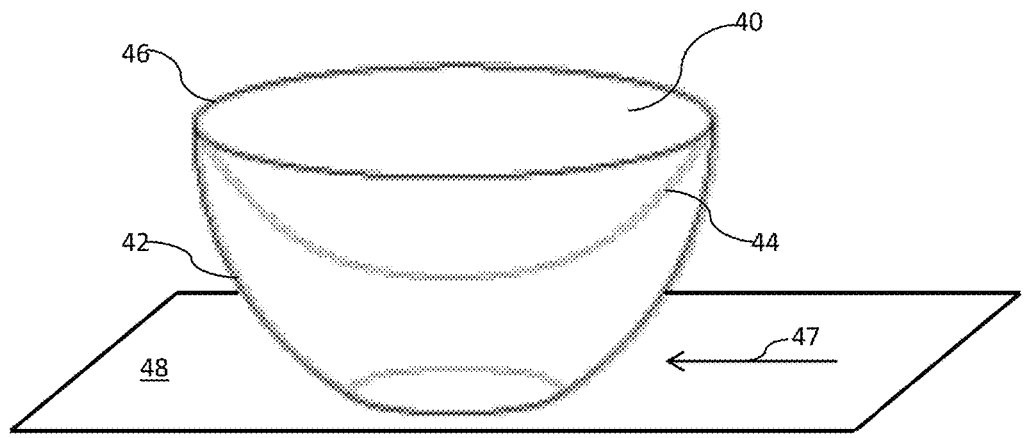
FIG. 4 schematically illustrates a sensor including a single radially symmetric ABH.

FIG. 4 illustrates an ABH 40 in which the edge 46 is an essentially two-dimensional circle that is defined by the intersection of the curve 42 with the curve 44. This particular design provides a radially symmetric design in which the single ABH edge 46 runs circumferentially about a radius, as shown.

Lines of symmetry may be used to incorporate one or more ABH into a single sensor. For example, in the embodiment of FIG. 2 in which a sensor can include a single ABH 20, the ABH 20 is symmetric to either side of the edge 26. In a configuration with two ABHs, such as the embodiment of FIG. 3, the sensor can be symmetric about a line of symmetry 38 that can be located at the lowest point in the inner profile, as shown. Thus, in this embodiment, the two ABH are aligned with one another, with the two edges running parallel to one another.

Figure 5:
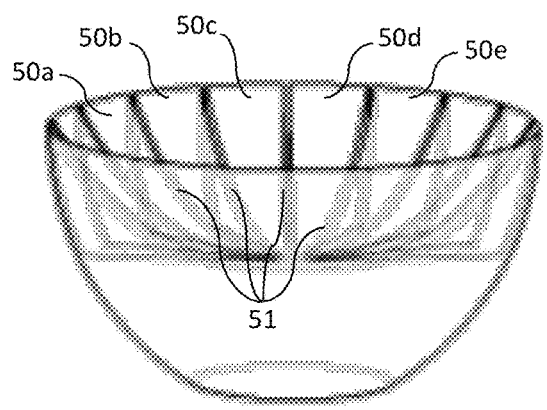
FIG. 5 schematically illustrates a sensor including multiple radially symmetric ABHs.

FIG. 5 illustrates a multi-ABH embodiment that includes a radially symmetric design with multiple ABHs 50a, 50b, 50c, etc., around the circumference of the sensor. In this embodiment, the sensor can include dividers 51. In other embodiments, the multiple ABH can be separated via an air gap that can mechanically separate adjacent ABH while allowing each ABH to vibrate separately.

A sensor including an ABH having a two-dimensional edge as shown in FIG. 4 or multiple ABH in a plurality of different orientations as shown in FIG. 5 can be utilized to convert the direction of motion of the source wave traveling in/on the surface to which the ABH is attached, which can improve detection capabilities of a sensor. For instance, and with reference to FIG. 4, when considering an acousto-ultrasonic wave traveling in a direction 47 along a surface 48 with which the ABH 40 is in mechanical communication, the two-dimensional curve of the edge 46 can convert the direction of motion of the medium to one or more different directions of motion for more convenient pickup by a motion detection component of the system (described in more detail below). As such, a sensor can provide data for an incoming source wave from any direction, i.e., the sensor can be omnidirectional.

The utilization of multiple ABH in a single sensor optionally combined with multiple orientations or alignments of the ABHs can be useful in determining information about an incoming source wave. For instance, the number and orientation of the ABHs of a sensor can be utilized to obtain excitation vibration/wave direction as well as to provide mode selectivity in the response. Differences in the amplitude and/or response time between ABHs at different orientations and/or locations can be utilized to determine the direction of motion of a source wave including planar vs. non-planar motion as well as propagation direction and speed along the surface of the structure being examined. For example, when utilizing a two ABH design as illustrated in FIG. 3, an out-of-plane excitation wave can cause the two edges 36, 37 to vibrate 180° out of phase with one another. In contrast, an in-plane excitation wave can cause the two edged 36, 37 to respond in phase with one another.

Through comparison of the response of multiple ABHs of one or more sensors of a system, demodulation methodology can be used to separate in-plane and out-of-plane components of a source excitation wave. Such demodulation can be carried out with multiple single-ABH sensors or with one or more multi-ABH sensors. Moreover, the multiple ABHs can be aligned with one another (e.g., as in FIG. 3) and/or can be arranged with various orientations (e.g., as in FIG. 5). Through analysis of the magnitude and relative phase between multiple ABHs of a system, the in-plane and out-of-plane components of the excitation motion can be separated, providing additional information about the excitation source and the health of the structure through which the wave is traveling.

Figure 6:
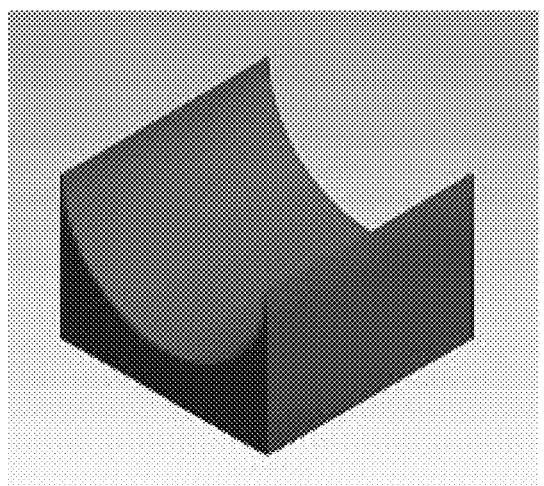
FIG. 6 presents a perspective view of a sensor including two ABHs about a line of symmetry.

A sensor can be configured to be held in good mechanical communication with a surface. For instance, a sensor can include have a flat base 68 as illustrated in FIG. 6 or curved base that can mate against the geometry of the surface to which the sensor will be attached. In addition, the sensor can be attached according to any methodology that will provide for good mechanical communication between the sensor and the surface. For example, the sensor can be bonded or otherwise attached to an internal or external surface of a structure by use of a bonding agent (e.g., an adhesive), an attachment mechanism (e.g., a bolt, screw, bracket, etc.), by direct bonding (e.g., melt bonding or surface formation of the sensor) or by any other device or approach. A sensor can be directly or indirectly attached to a surface. For instance, a sensor can be carried by a patch or an appliqué that is directly attached to the surface.

A sensor can be formed of any suitable materials capable of being formed with the ABH edge or point. For instance, an ABH can be formed of metallic materials including metals and metal alloys (e.g., aluminum, stainless steels), polymeric materials and composites (e.g., carbon fiber composites, glass fiber composites, etc.), inorganic materials (e.g., ceramics), and so on. In one embodiment, the sensor can be formed of materials so as to magnify the displacement of the ABH edge, which can increase the sensitivity of the sensor. For instance, it is known in the art when forming an ABH intended for use in a damping application that various combinations of materials can be utilized to increase the wave energy dissipation near the sharp edges of the ABH by covering the ABH near the edge with thin energy absorbing layer such as a polymeric film. This can function as a damping layer on the ABH and increase the energy absorbance of the structure. In a similar fashion, material selection and combinations can be utilized to increase the displacement of the ABH edge when excited with a source wave.

In general, the ABH can be formed with a relatively low damping level as compared to ABH formed for damping applications, as a low damping level can provide a higher level of sensor sensitivity. On the other hand, and depending upon the specific application, it may be desirable for the sensor to exhibit some damping at the ABH edge, in order to prevent excessively long response (i.e., "ringing") from the ABH. Thus, it may be useful in some embodiments to apply a damping material (also commonly referred to as a backing material) such as a thin polymeric film to an ABH edge in order to obtain the desired response in the intended application. The application of a targeted level of damping is standard in the practice of ultrasonic transducer design and factors such as the type of damping material, location of placement, amount, and geometry of damping materials can be used according to standard practice in order to provide a sensor that exhibits a desired level of damping.

The sensor may be formed so as to be used either as a resonance sensor to detect signals at the sensor resonance frequency, or in a broadband frequency mode. Sensor resonance can be varied and is tunable by modification of the material properties and geometry as is known for other known ultrasonic sensors. For instance, a sensor can be formed such that the ABH edge can operate in a range of from about 50 kHz to about 2 MHz in some embodiments, however, slower or faster vibrational response is also encompassed herein, with a preferred resonance frequency and/or broadband frequency generally depending upon the specific characteristics of the application, e.g., materials, damage type, and expected wave frequency dispersion characteristics of the medium that the sensors will be examining.

Upon excitation, a sensor can display relatively large displacement at the ABH edge. To obtain information with regard to the excitation and through that information the structural health of the medium, the system can include a motion detector in communication with the ABH edge or point that can be configured to detect this displacement. While either contact or non-contact sensing can be used, it can be preferred in some embodiments to use a non-contact detection method to prevent loss in performance by added stiffness and mass due to the presence of the motion detector in contact with the ABH edge.

Figure 8:
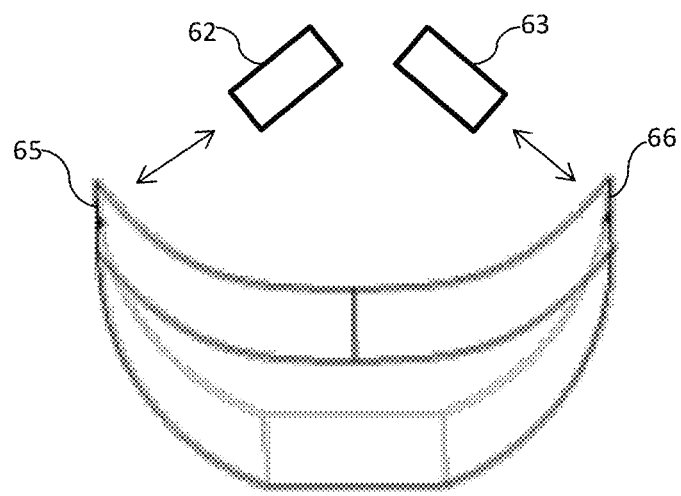
FIG. 8 illustrates components of a system including a sensor with two ABHs and a non-contact motion detector.

Any of a variety of different motion detectors as are generally known in the art may be utilized in a system. For instance, FIG. 8 illustrates a system including a dual ABH sensor 60 and a non-contact motion detector 62 in communication with the edge 66 of one of the ABHs. A motion detector 62 can utilize any suitable mechanism for communication include optical, magnetic, electronic, and so forth. For instance, an optical motion detection system can incorporate infrared, visible, or ultraviolet transmission and reception by use of lasers, optical fibers, or any other systems as are generally known in the art.

In one embodiment, an optical fiber-based non-contact motion detection device such as an external Fabry-Perot interferometer may be used. A Fabry-Perot interferometer uses two reflective surfaces that are not directly mechanically connected in determination of motion. Examples of optical fiber non-contact motion detectors as may be utilized in a sensing system have been described, for instance in U.S. Pat. Nos. 6,713,743; 5,812,26; 6,459,492; and U.S. Patent Application Publication No. 2014/0082775, all of which are incorporated herein by reference.

One possible configuration of an optically-based motion detector is illustrated in FIG. 8. In this embodiment, each ABH can include a reflective material at or near the edge 65, 66. For instance a reflective surface can be added at or near each edge 65, 66 as a thin layer (e.g., by adhesive bonding), patterned via micro/nano patterning directly onto the surface, or any other suitable route. Optical sensors 62, 63 can be located in communication with each edge 65, 66. The sensors 62, 63 can both transmit light to the edges 65, 66 and receive reflections back from the edges 65, 66 independently or in communication with one another. Upon excitation and vibration of the edges 65, 66, the distance between each edge 65, 66 and its respective sensor 62, 63 can be determined, which can provide the changing distance between the edges 65, 66. This changing distance can be related to sensor vibrational displacement. Other information as may be gathered by the sensors 62, 63, such as variation in initial excitation time between the ABH edges 65, 66, phase difference in vibrational signals between the ABH edges 65, 66, etc., can provide additional information about the excitation source such as propagation direction and speed, in-plane and out-of-plane components, and so forth. In this embodiment, the reflective surface of each edge can maintain the resonant cavity irrespective of orientation angle of the surfaces by reflecting directly back to the source.

Figure 9:
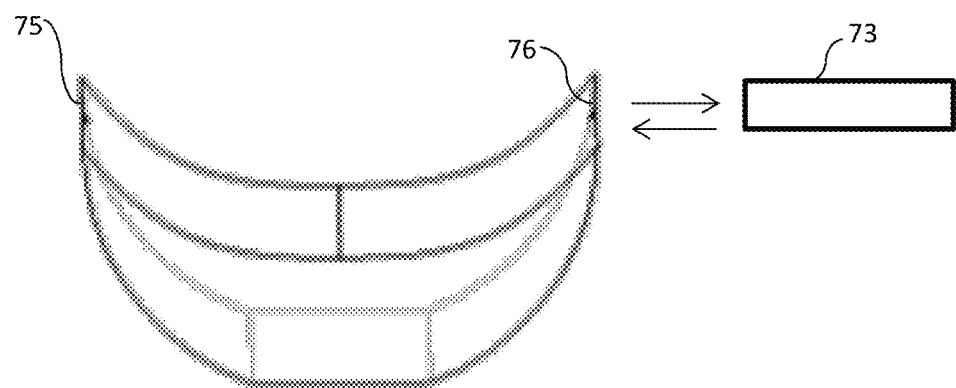
FIG. 9 illustrates components of another detection system.

Another configuration of an optically-based motion detector is illustrated in FIG. 9. In this embodiment, the system can include a dual signal transmitter/receiver 73 configured to transmit a signal (e.g., a laser signal) to the reflective surface of the ABH edge 76 and to detect reflections from the edge 76 to detect the position of the edge 76 relative to the transmitter/receiver 73 and thereby detect motion and transient displacement of the edge 76. Through retroreflection, the signal from the signal transmitter/receiver 73 is reflected back independent of orientation angle. The motion can be detected through signal modulation that occurs due to a change in the air gap distance. A similar transmitter/receiver can be located in optical communication with the second ABH edge 75. Information obtained from the receiver 73 can be communicated to a processor in conjunction with data from other sensors in the system as is known in the art.

Figure 10:
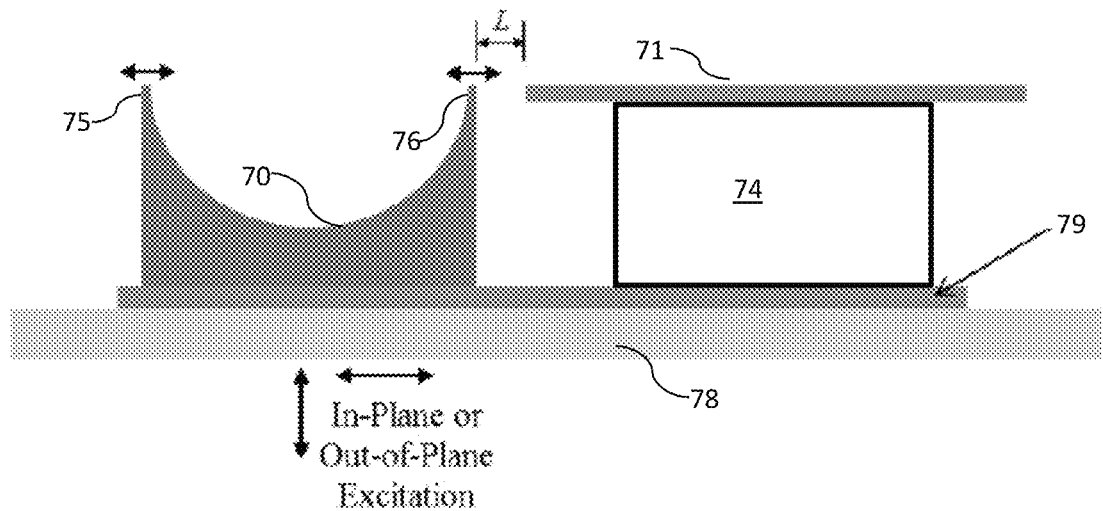
FIG. 10 illustrates a non-contacting sensing system.

Another embodiment of a Fabry-Perot interferometer type non-contact displacement sensor 70 is illustrated in FIG. 10. In this sensor, reflected light intensity is proportional to the length of a gap between two reflective surfaces. In response to either in-plane or out-of-plane base excitation, each sensor tip 75, 76 will move in a longitudinal direction as indicated that is parallel to the longitudinal axis of the optical fiber 71, e.g., a single mode optical fiber 71. The distance L between the ABH sensor 70 and the optical fiber 71 serves as the Fabry-Perot optical resonance cavity. Modifications to the ABH setup may be carried for such a configuration. For instance, the optical fiber can be mounted to a supporting structure 74 (e.g. a "mounting block"). Both the mounting block 74 and the ABH sensor 71 can be attached to a host structure 78 by, e.g., a thin bonding layer 79 so their precise alignment is maintained.

Figure 11:
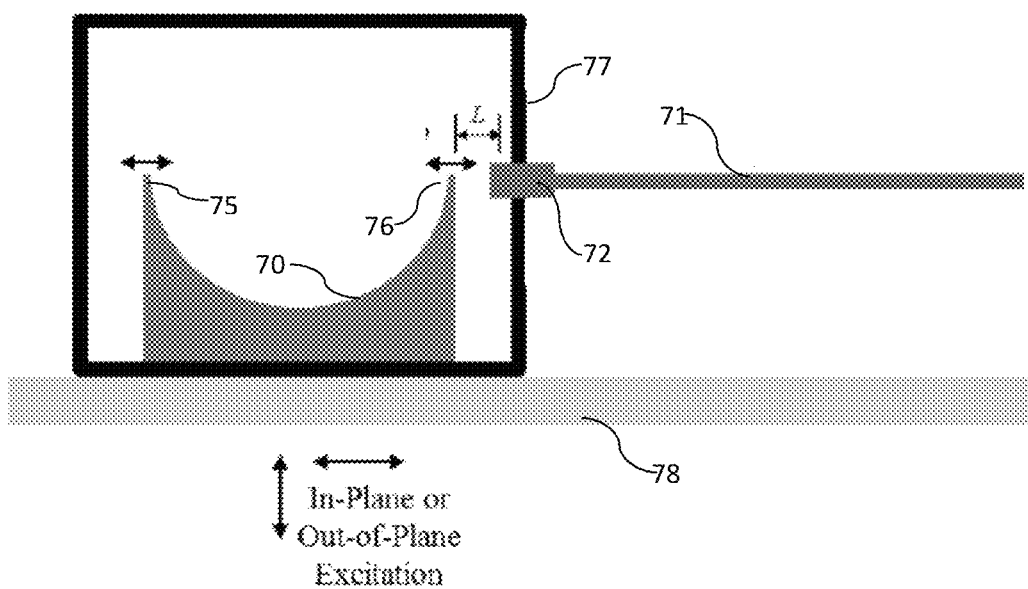
FIG. 11 illustrates another non-contact sensing system.

Another configuration is shown in FIG. 11. In this embodiment, instead of a mobile bonding layer, a sensor housing 77 is used as the common structure. The optical fiber 71 can be attached to the sensor housing 77 through the use of a fiber coupler 72, as shown.

Figure 12:
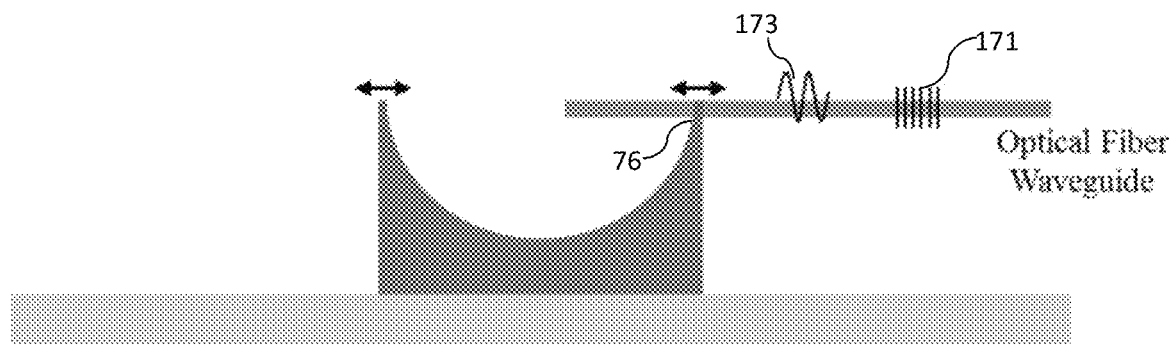
FIG. 12 illustrates a point-contact fiber Bragg grating (FBG) configuration for a sensing system.

FIG. 12 illustrates a single-point bonded FBG sensing configuration. In this approach, the FBG optical fiber 171 is bonded to the sensor tip 76, and the motion of the sensor tip 76 induces elastic waves 173 in the optical fiber. The point-contact bond is able transfer motion into longitudinal wave modes that propagate along the optical fiber for sensing by a distant FBG. A benefit of this approach is its simplicity. A potential downside to this embodiment is that there is a possibility that by bonding the fiber to the tip of the ABH, the ABH performance will be diminished.

Figure 13:
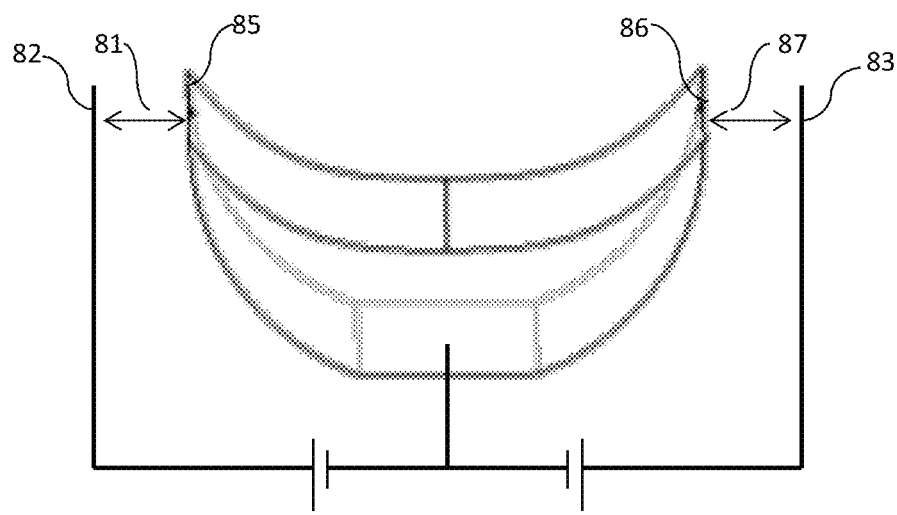
FIG. 13 illustrates components of a system including a sensor with two ABHs and an electromagnetic motion detector.

In another embodiment, a capacitive- or inductive-based motion detector can be used, one embodiment of which is illustrated in FIG. 13. For example, a system can include fixed plates 82, 83 placed proximal to the ABH edges 85, 86. The edges 85, 86 are in electrical communication with the fixed plates 82, 83. For instance, the edges 82, 83 can be formed of an electrically conductive material (e.g., a metal or metal alloy, a piezoelectric ceramic, an electrically conductive polymer, etc.), or can have an electrically conductive material attached to the edge 85, 86. Upon application of a voltage across each gap 87, 81, variation in distance upon excitation of the sensor and vibrational response of the edges 85, 86 can be determined with high accuracy through variation in the capacitance as may be determined through association with a tuned or measuring circuit as is known in the art.

It should be understood that while a non-contact motion detection system may be useful in some embodiments, the systems are not limited to non-contact motion detection devices, and contact motion detectors as are known in the art can be utilized in a system. By way of example, a contact motion detector in which the detector, e.g., a piezoelectric motion detector, an optical fiber (e.g., a fiber Bragg grating sensor), etc. can be attached to or embedded in or near the ABH edge, can be utilized in a system.

A system can include current paths or signal lines to and from each sensor, as needed, for example through a suitable form of metallic deposition, etching, or bonding or via wires attached to the structure that carries the sensor. The thus-formed network can serve to aggregate signals from one or more sensors such that a single cable can connect the network to the data acquisition system. Of course, separate communication wires or cables may extend between each respective sensor as is known as well.

A sensor can be in communication with a data acquisition system as is generally known in the art. For instance, a sensor can communicate with a data acquisition system wirelessly and/or through direct wired connections. For example, a system including at least one sensor and at least one motion detector can be capable of utilizing wireless technology, such as radio frequency emissions (e.g., via RFID, broadband, WiFi, Bluetooth®, Zigbee®, etc. communication) or other wireless techniques (e.g., via infrared communication) to communicate with a data acquisition system.

During use, a potential damage-inducing event at or near a sensor can cause transient motion of an ABH edge or point of the sensor. This motion can then be detected by the motion detector and translated to an electrical current, which can be stored as a digital value and/or communicated to a data acquisition system. In addition, the time that the event occurred may be stored. Typically, damage-induced events can be indicated when the data of one or more sensors varies from standard or baseline information (e.g., data acquired at a previous maintenance check using the same technique to generate the event within the structure), with the variation typically being more than a predefined percentage or more than a predefined amount (in absolute terms).

In one embodiment, the system can be configured as an active sensor. In this embodiment, the system can include one or more transducers embedded or attached to a surface of a structure. The transducers can be capable of transmitting a signal that can be detected by sensors in mechanical communication with the surface.

For instance, a transducer can be a piezoelectric wafer active sensor (PWAS). PWAS have emerged as a common element for SHM technology as by use of PWAS transducers, one can apply a variety of damage detection methods including, without limitation, propagating acousto-ultrasonic waves, standing waves (electromechanical impedance) and phased arrays. PWAS attached directly to structural elements have gained large popularity due to their low cost, simplicity, and versatility. According to one embodiment, PWAS can be used for active structural sensing through generation of guided waves including one or more of propagating Lamb waves, standing Lamb waves (electromechanical impedance) and phased arrays. The propagating wave methods can include: pitch-catch; pulse-echo; thickness mode; as well as passive detection of impacts and acoustic emission (AE).

A guided wave is an acoustic wave including propagation vectors guided in a direction parallel to the surface of a structure. Beneficially, guided waves are capable of coupling their energy throughout the structure thickness. These two characteristics make guided waves an ideal candidate for SHM applications.

Figure 14:
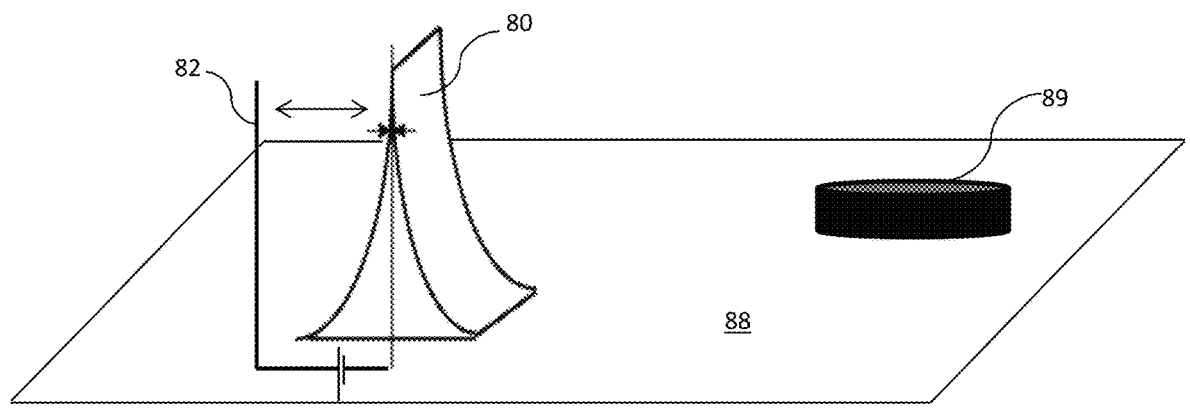
FIG. 14 illustrates a system capable of use as an active SHM system.

FIG. 14 illustrates one embodiment of an active system in which a generator (not shown in FIG. 14) can be operative to impress a pulse having a predetermined excitation frequency upon a transducer 89 to produce ultrasonic waves over certain Lamb modes and wavelengths in the medium 88 of the structure. For instance, an excitation signal from a function generator can be sent to a transducer 89 where the signal can be transformed to generate guided waves throughout a medium 88. Such a system can include a module capable of wired or wireless communication with the transducer 89 that can include a tone-burst signal generator as is generally known in the art that can create a synthesized window-smoothed tone-burst signal with adjustable amplitude and repetition rate, a transmission beamformer (algorithm) at angle $\varphi_0$, a reception beamformer (algorithm) at angle $\varphi_0$, and a signal processor unit for signal deconvolution; time of flight (TOF), and range estimation. The signal can induce vibration in the ABH edge of the sensor 80 that can be detected at capacitive motion detector 82.

In addition to a sensor and motion detector and any optional active components, a system can include a data acquisition device, e.g., a digital oscilloscope. A data acquisition device can be either continually or periodically in communication with the other components of a system. In one embodiment, a data acquisition device can be held remotely from the structure that is to be monitored. As such, the data acquisition device need not be permanently carried with the structure and can be, e.g., maintained at a terminal for use following transit of a vehicle to be monitored or for periodic monitoring of an immobile structure (e.g., a bridge or building). The data acquisition device can collect information from each sensor/detector system and (when present in an active system) the transducers in communication with the sensors.

The data acquisition device may be connected to a computer or other suitable processing device through a general-purpose interface bus (GPIS), such that the data can be collected and analyzed to determine the nature of any abnormalities in either an active or passive system. For instance, when considering an active system, upon generation of the guided waves within the medium, the guided waves can be reflected and/or diffracted by any structural discontinuities, boundaries, damaged areas or other anomalies. The reflected/diffracted waves can be detected by one or more sensor systems, where they can be transformed into electric signals by operation of the individual motion detectors. Similarly, the data acquisition and processing systems can be capable of providing information concerning a potential damaging event occurring to the structure based on the data acquired by the passive sensor(s) in response to ambient events.

One or more components of the data acquisition and/or processing systems can be remote from the structure itself, which can decrease weight and space requirements of the system. For instance, the sensor/detector system can be capable of wirelessly transmitting the acquired data. In one embodiment, a system can include a memory device by which data from the sensing system can be stored, and at a later time the memory device can be placed in communication with a processing system to determine from the acquired data the occurrence and general location of a potentially damaging event.

The SHM system can be used to inspect any number of structures in a variety of industries where detection of flaws or defects in or near a solid medium is required, such as in the aircraft, automotive, marine, or construction industries. The system can be capable of detecting any number of flaws or defects within or along the surface of a structure, such as impact damage (e.g., delaminations and matrix cracking), disbonds (e.g., airframe/reinforcing members or honeycomb composites), discontinuities, voids, or porosity, which could adversely affect the performance of the structure.

By way of example and without limitation, industrial applications include those which use nondestructive evaluation (NDE) and structural health monitoring (SHM) techniques for monitoring structural integrity through ultrasonic waves. These include civil engineering applications (e.g., bridges, buildings, transportation systems, etc.), energy infrastructure applications (wind turbines, nuclear applications, pipelines, offshore, etc.), aerospace industry (e.g., aircraft structural monitoring), national security application (e.g., surveillance for anti-submarine warfare, anti-terrorism, etc.), biomedical applications (e.g., in vivo sensors such as for implants, high-sensitivity ultrasound medical imaging), manufacturing quality control (e.g., acoustic emission monitoring during manufacturing).

The present disclosure may be better understood with reference to the examples set forth below.

Example 1

Figure 15:
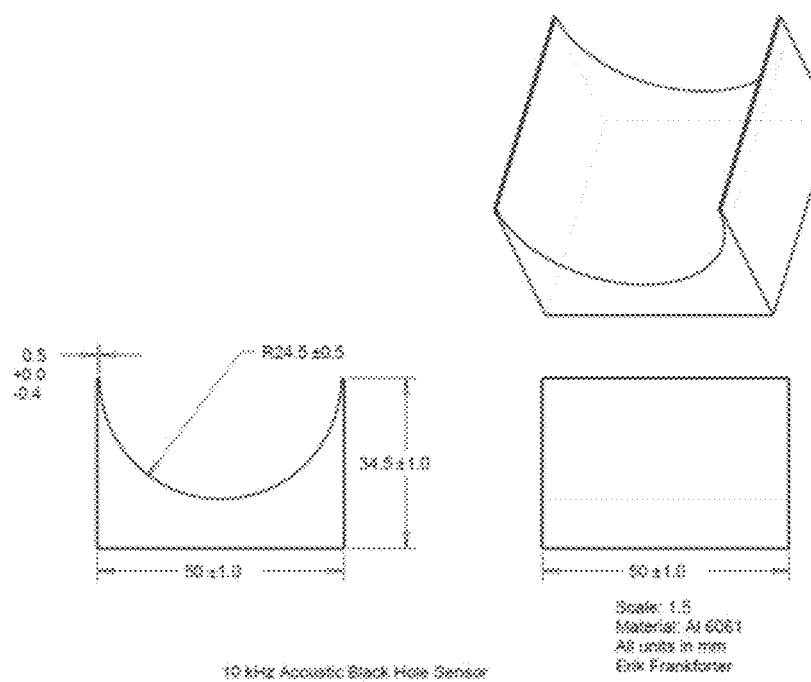
FIG. 15 illustrates a front, top, and perspective view of a scaled-up sensor prototype.
Figure 16:
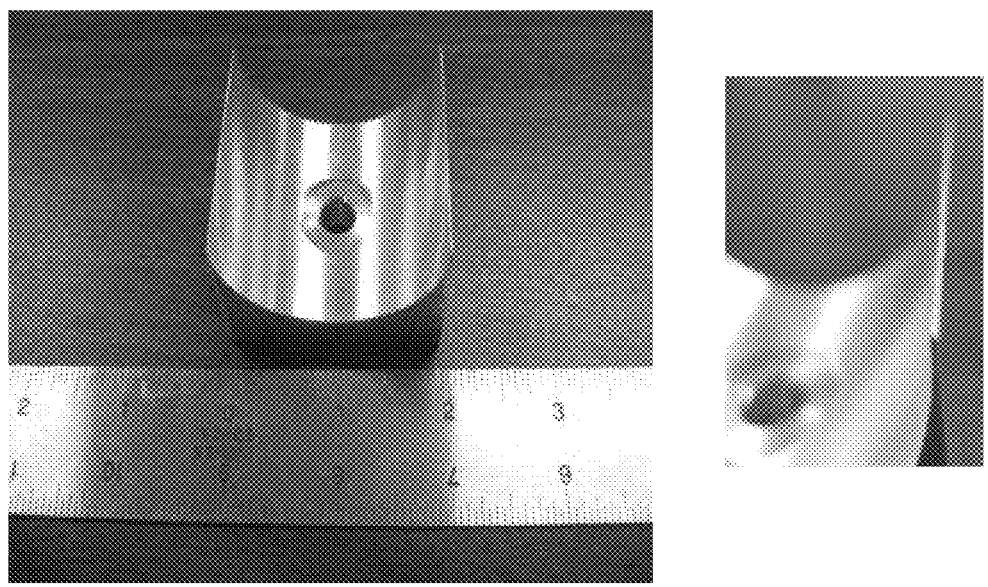
FIG. 16 illustrates photographs of a scaled-up sensor prototype.

A scaled-up prototype ABH-based sensor was formed to examine shaker testing. Front, side, and perspective views of the prototype are shown in FIG. 15 and photographs of the prototype are shown in FIG. 16. The prototype included a circular profile with a base of 50 mm×50 mm and a height of 34.5 mm to generate an ABH edge having a thickness of 0.5 mm. The prototype included two ABH edges as shown to allow for sensing of an out-of-plane excitation wave. This scaled-up prototype had a resonance frequency of 10 kHz; sensors for industrial use would be expected to be formed to much smaller dimensions to provide higher resonance frequencies.

Figure 17:
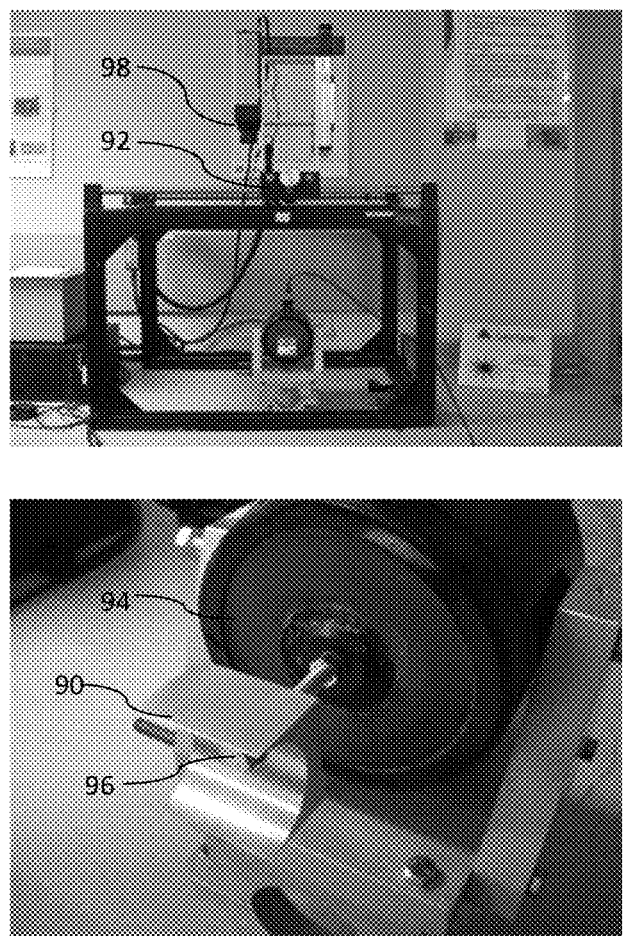
FIG. 17 illustrates an experimental set-up utilized to examine the prototype.

The experimental set-up is illustrated in FIG. 17. In the top panel is shown the laser Doppler vibrometer 98 and a 2-D translational stage 92. The lower panel shows a closer view of the shaker table 94, mounting bolt 96 and ABH sensor 90. The shaker table was mounted so as to be allowed to rotate to obtain both in-plane and out-of-plane measurements.

Chirp experiments were used to determine resonance frequencies and amplitude of the sensor. Harmonic excitation at select resonance frequencies was also carried out to determine amplitude and mode shapes of the sensor response. The 2-D translational stage was capable of moving the laser Doppler vibrometer so as to acquire various mode shapes.

Figure 18:
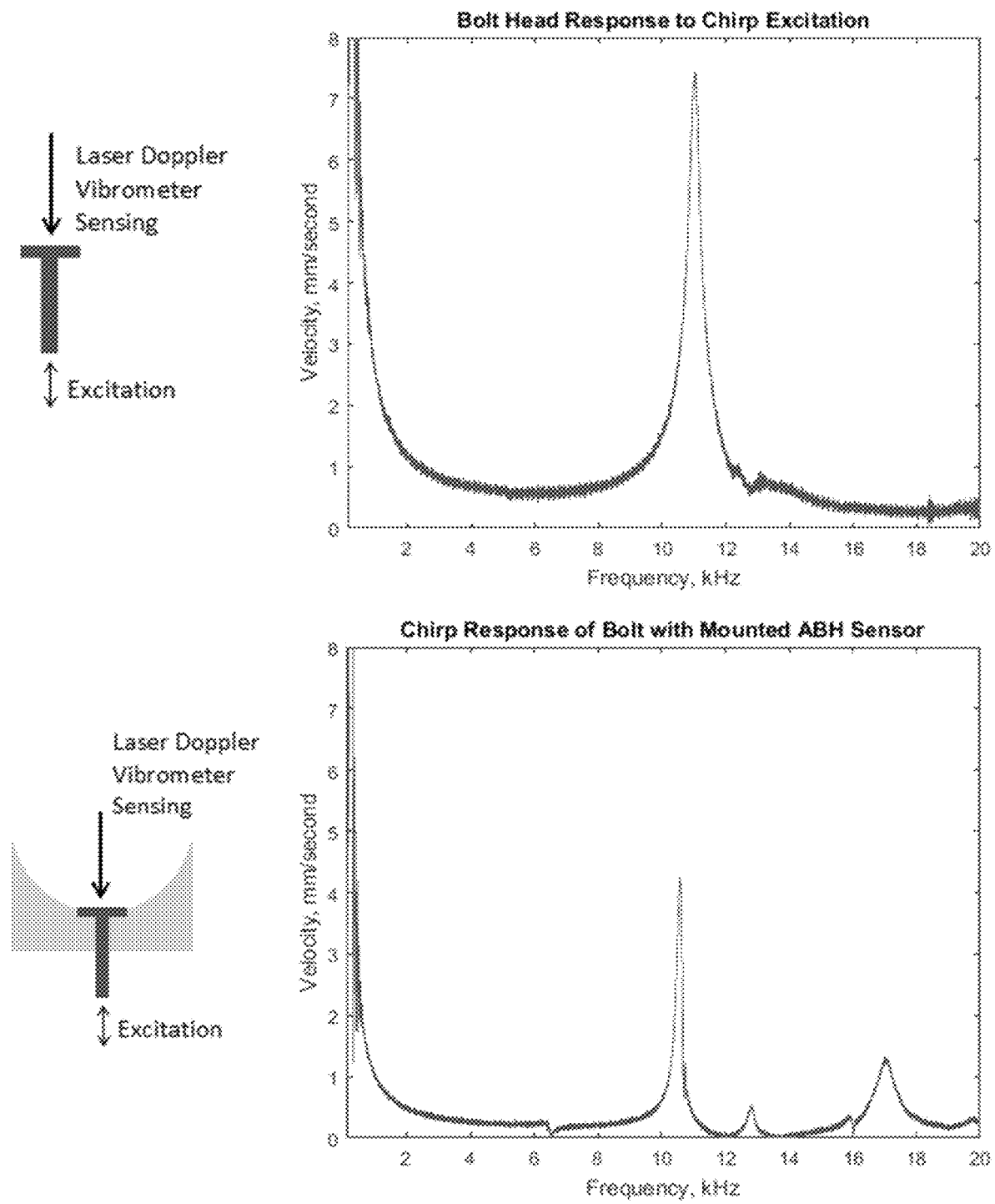
FIG. 18 presents calibration data of the experimental set-up.

The calibration data for the chirp experiments are shown in FIG. 18. Chirp experiments were carried out with excitations from 1 Hz up to 20 kHz. Calibration of the shaker without the ABH sensor attached (top panel) gave a resonance frequency of 11 kHz. Calibration of the shaker with the ABH installed (bottom panel) showed multiple resonances and antiresonances, possibly due to the ABH sensor resonances.

Figure 19:
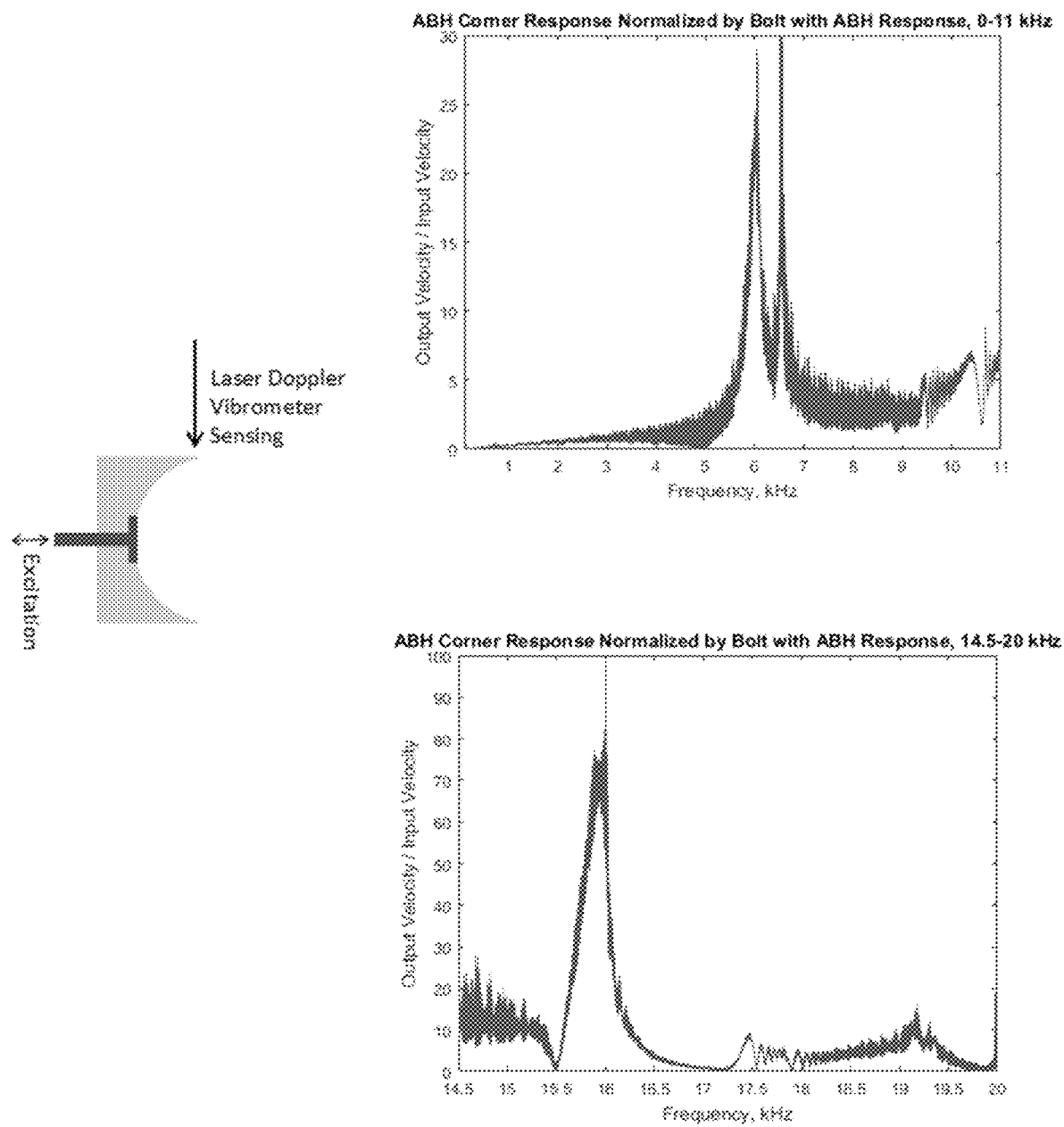
FIG. 19 presents experimental results of a prototype system.
Figure 20:
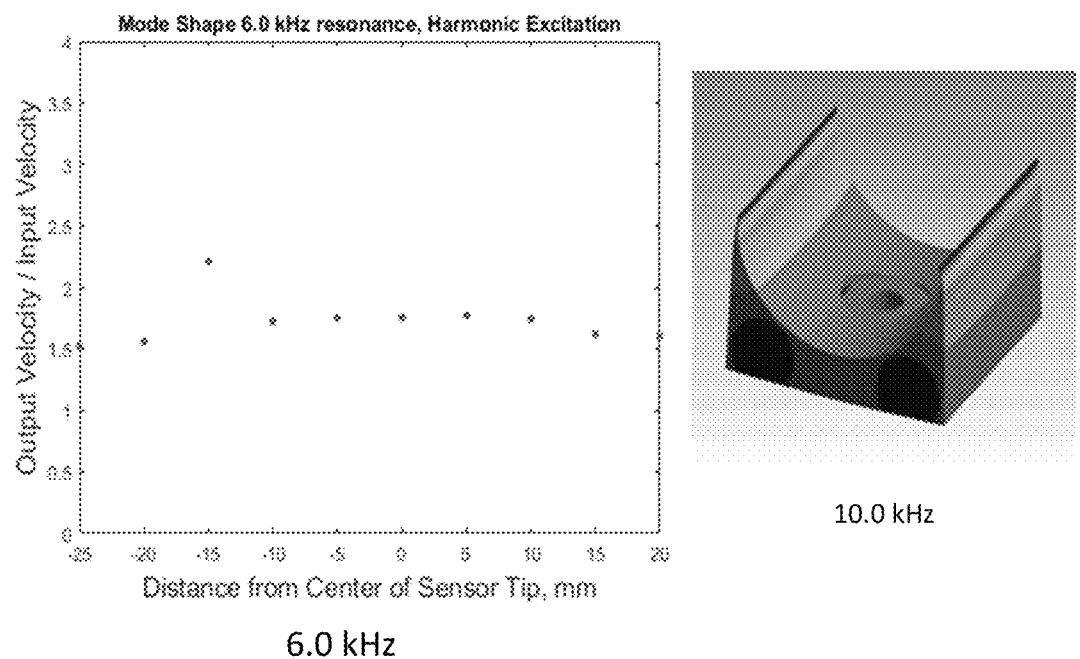
FIG. 20 presents results of harmonic experiments at 6.0 kHz and comparison to finite element modeling (FEM).
Figure 21:
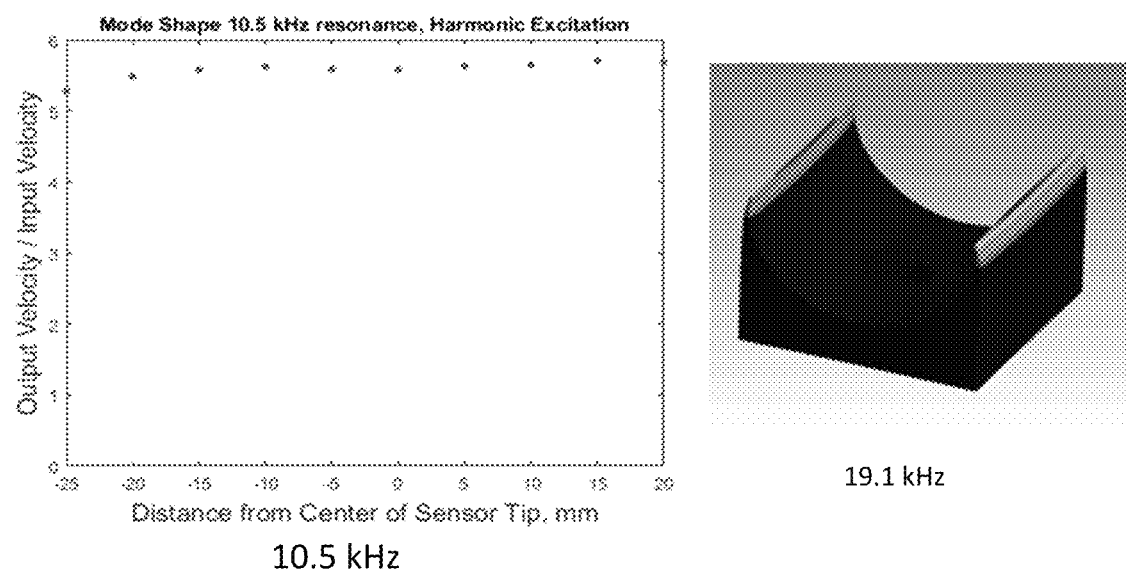
FIG. 21 presents results of harmonic experiments at 10.5 kHz and comparison to FEM.
Figure 22:
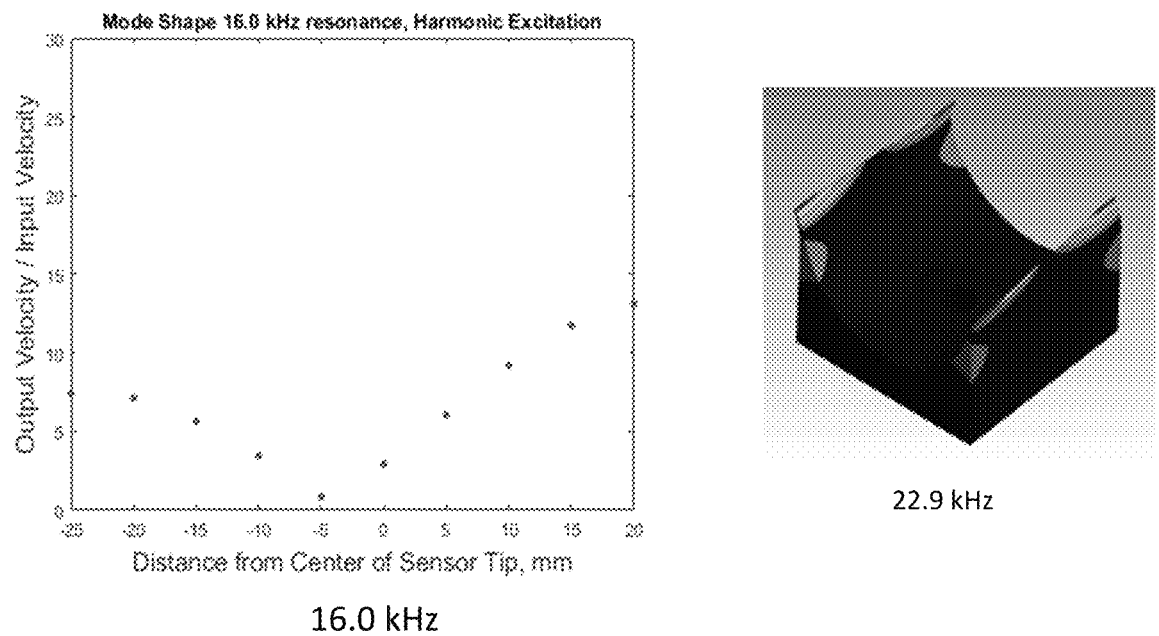
FIG. 22 presents results of harmonic experiments at 16.0 kHz and comparison to FEM.

Results of the chirp experiments are shown in FIG. 19. The top panel shows the response at 0-11 kHz and the bottom panel shows the resonance at 14.5-20 kHz. The regions from the calibrations that showed near zero velocity were excluded due to noise-induced artifacts. As shown, there were clear resonances presents at approximately 6.0 kHz, 10.5 kHz, 15.9 kHz, and 17.5 kHz and significant mechanical amplification present at 6.0 kHz and 15.9 kHz.

Harmonic excitation experiments were carried in which the four resonance frequencies obtained in the chirp experiments were excited with harmonic motion and scanning was obtained across a sensor to determine mode shapes. Following, the mode shapes were compared to finite element model (FEM) for model validation. The same basic steps were carried out as in the chirp experiments including 1—Bolt head velocity measured for calibration 2—ABH edge velocity measure for sensor motion; and 3—The two values are divided to obtain an amplification factor Results for each of the four different frequencies are shown in FIG. 20, FIG. 21, FIG. 22, and FIG. 23. As can be seen, relative motion measured by the laser Doppler vibrometer scans across the tip of the ABH can be matched to FEM mode shapes proximal to the experimental driving frequency, verifying the predicted mechanical motion of the ABH sensor.

Both the chirp and harmonic excitation experiments indicated significant amplification of the ABH sensor, with the chirp experiments showing a 30-80 times amplification of the base motion (after the near-zero excitations were excluded) and the harmonic experiments showing about 30 times amplification of the base motion. Thus, even with this scaled-up prototype, the sensors show excellent amplification and sensor characteristics.

Example 2

Figure 23:
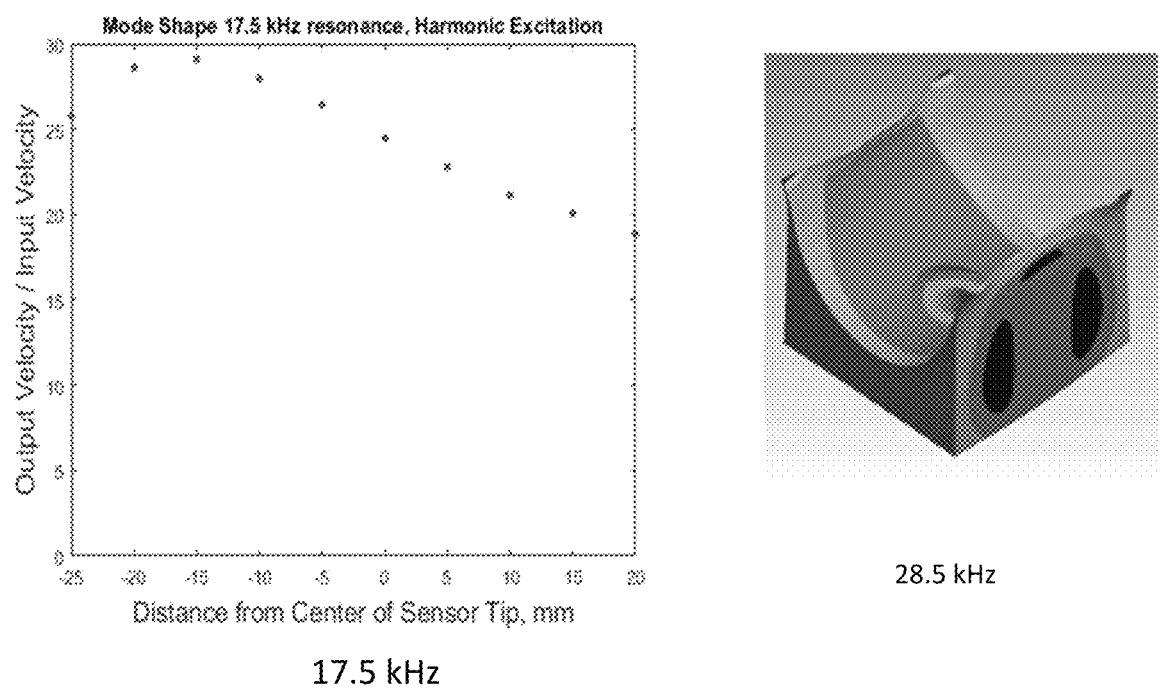
FIG. 23 presents results of harmonic experiments at 17.5 kHz and comparison to FEM.
Figure 24:
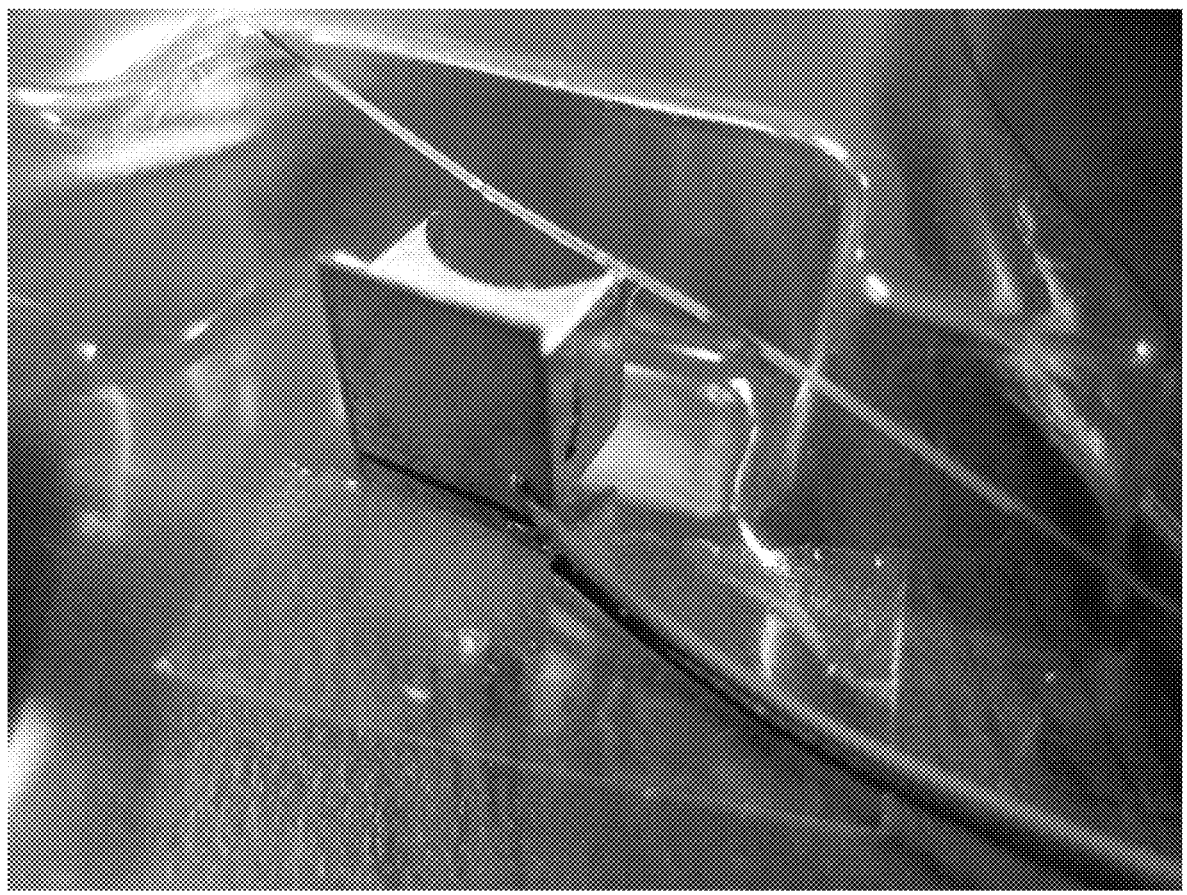
FIG. 24 illustrates a sensing system used in Example 2.

A sensor having a shape similar to that of FIG. 15 was formed and designed for 100 kHz resonance in response to out-of-plane excitation. The sensor was designed to have a square base of 6.5±0.1 mm in length, a height from the base to the ABH edges of 5.05±0.1 mm, each ABH edge thickness of 0.15±0.05 mm and a curvature between the two ABH had a radius of 3.1 mm, by which the height from the base to the bottom of the curvature would be 1.95 mm. FIG. 23 schematically illustrates the relationship between the sensor including the two parallel ABH and a fiber Bragg grating sensor used in the example. A PWAS was bonded to the ABH sensor and an optical fiber bonded on the sensor side proximal to the sensor tip as illustrated in FIG. 24. For bonding, a micropipette was used to dispense a small amount of cyanoacrylate adhesive.

Figure 25:
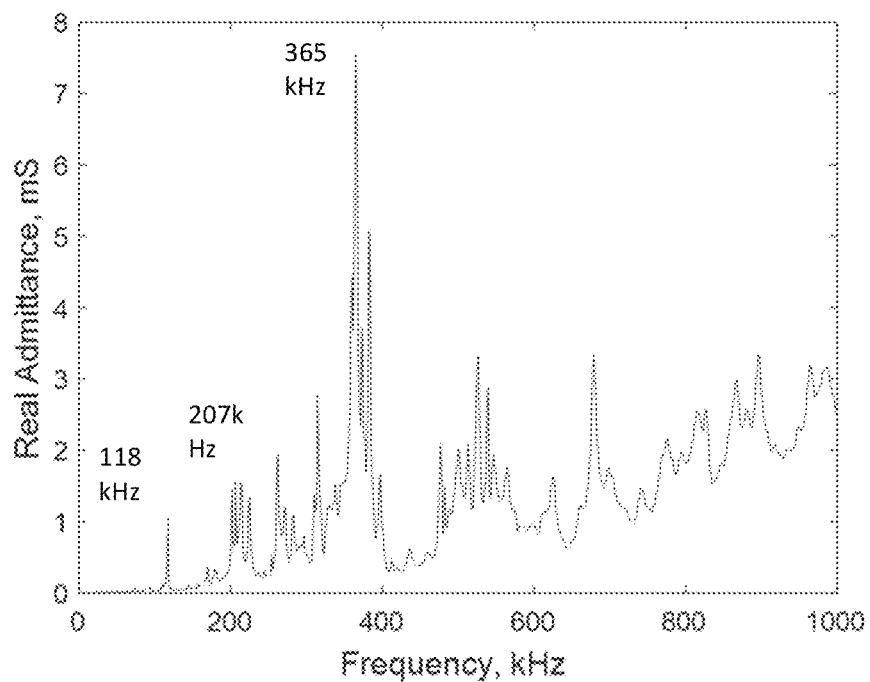
FIG. 25 presents the electromechanical admittance spectrum of an ABH sensor with instrumented a piezoelectric element

Upon formation, the actual sensor was found to have a square base of 5.75 mm in length, a height from the base to the ABH edges of 4.8 mm, and each ABH had an edge thickness of approximately 0.20 mm. An electromechanical impedance spectroscopy (EMIS) experiment was used to assess the ABH sensor resonance with excitation signals applied to the base of the sensor. A fundamental resonance was found to be present at 118 kHz with higher harmonics starting at 207 kHz (FIG. 25).

Figure 26:
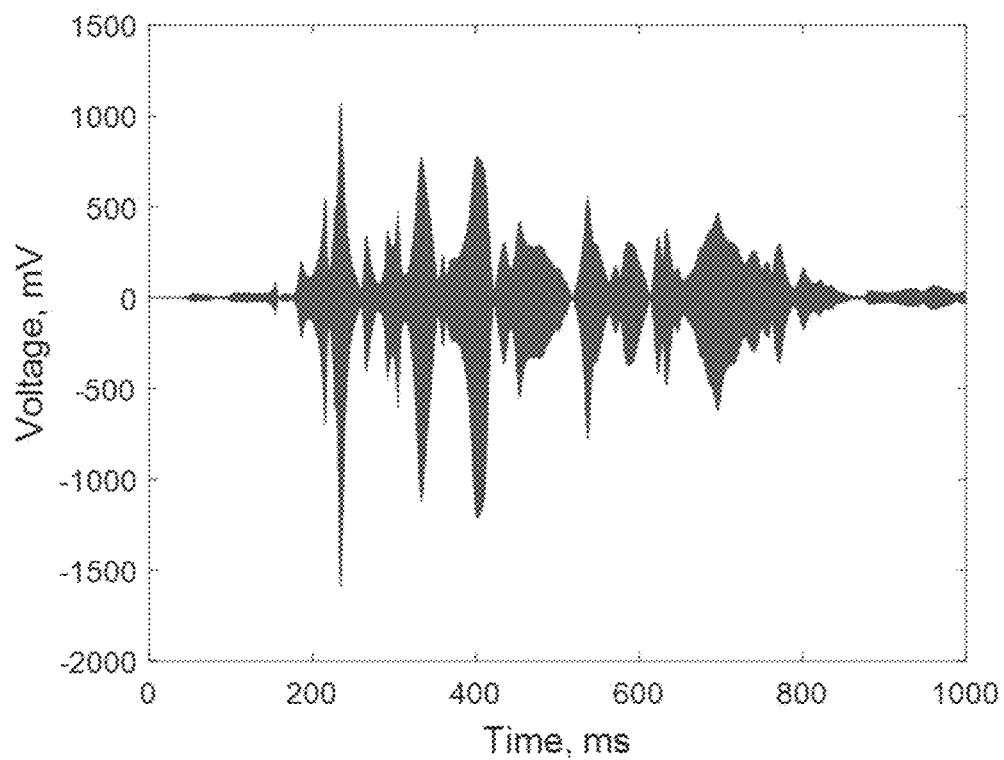
FIG. 26 presents the time response of a sensor to a chirp excitation at a broad range of frequencies.
Figure 27:
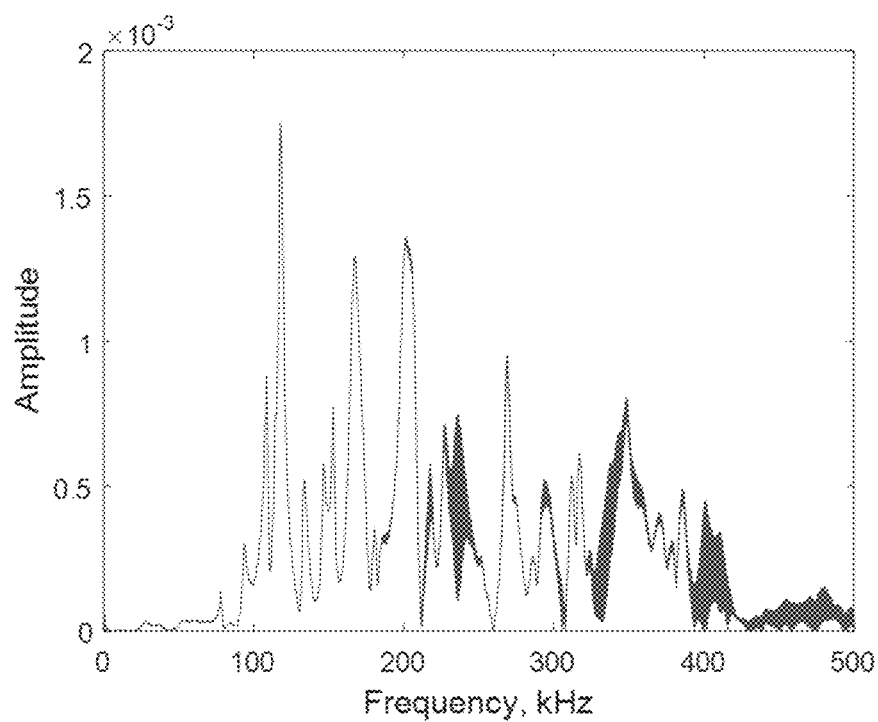
FIG. 27 presents the frequency response of a sensor to a chirp excitation at a broad range of frequencies.

A chirp excitation (1-500 kHz, 20 Vpp) was used to test the ABH FBG sensor system. Results including the time response and the frequency response are shown in FIG. 26 and FIG. 27, respectively. As shown, there are a large number of resonance modes across the 100-400 kHz range and this indicates that the ABH FBG sensor may be broadband in application.

Figure 28:
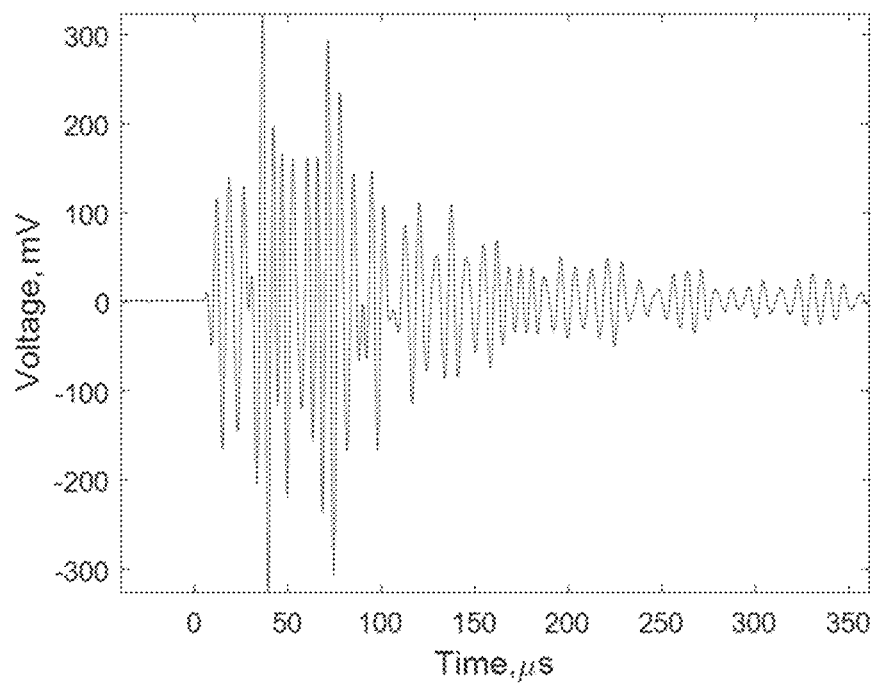
FIG. 28 presents the time response of fiber Bragg grating sensing of ABH tip motion under excitation with a 150 kHz 3-count Hanning windowed tone burst.

A PWAS bonded to the ABH sensor was used to excite a 150 kHz 3-count Hanning windowed tone burst excitation. This frequency was found to produce a maximal response of the ABH sensor to this type of excitation. The results are illustrated in FIG. 28. The signal to noise ratio was very high. It was believed that the noise was from digitization and oscilloscope noise, not optical equipment, indicating high sensor sensitivity.

Example 3

Figure 29:
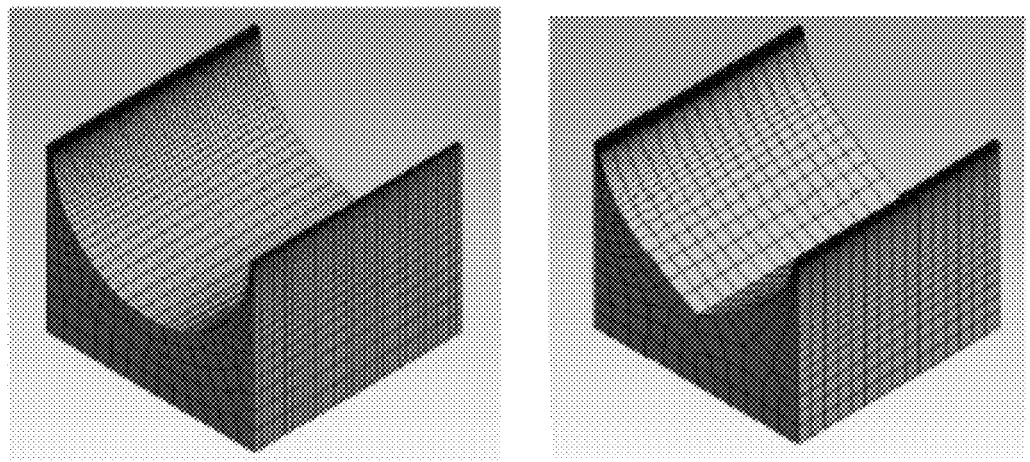
FIG. 29 illustrates two different tapers for ABH sensors as described herein.

An FEM comparison of a circular versus a quadratic taper was performed. The geometry of the sensor of Example 2 was used as a reference. The same width, tip width, height, base height, and depth were used in the quadratic taper sensor. The only difference was the use of two quadratic tapers, one for each ABH tip. The taper is prescribed by one half of a parabola oriented horizontally (i.e. by $x=c(y-h)^2$, $y \leq h$)). The FEM meshes are shown in FIG. 29 including the circular taper on the left and the quadratic taper on the right.

Figure 30:
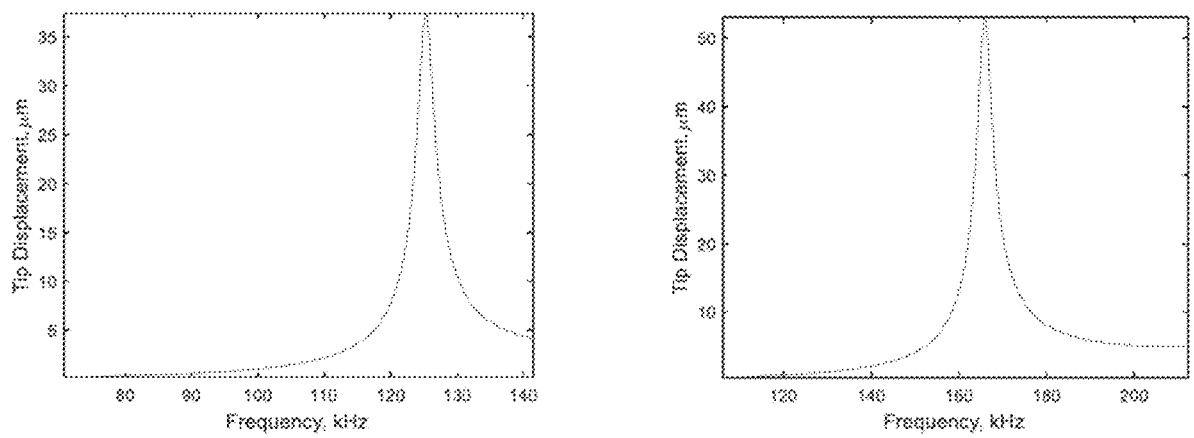
FIG. 30 presents theist resonance of sensors incorporating the tapers of FIG. 29.

A harmonic analysis was performed with a prescribed 1 μm out-of-plane displacement at each sensor base. The harmonic responses of the 1st resonance frequencies are shown for each in FIG. 30 including the circular taper response on the left and the quadratic taper response on the right. The circular profile had a 38 times displacement amplification, whereas the quadratic ABH sensor had a 53 times displacement amplification. A significant frequency shift was also present. The character of the 1st resonance mode shape (both tips vibration 180° out of phase) was not changed.

In practice, the sharp intersection of the two quadratic ABH profiles at the midline of the sensor would be rounded during manufacturing. Because of this, a separate harmonic analysis was performed, where this sharp intersection was replaced with a 1 mm round. There were no changes in sensor performance for this model.

Example 4

Figure 31:
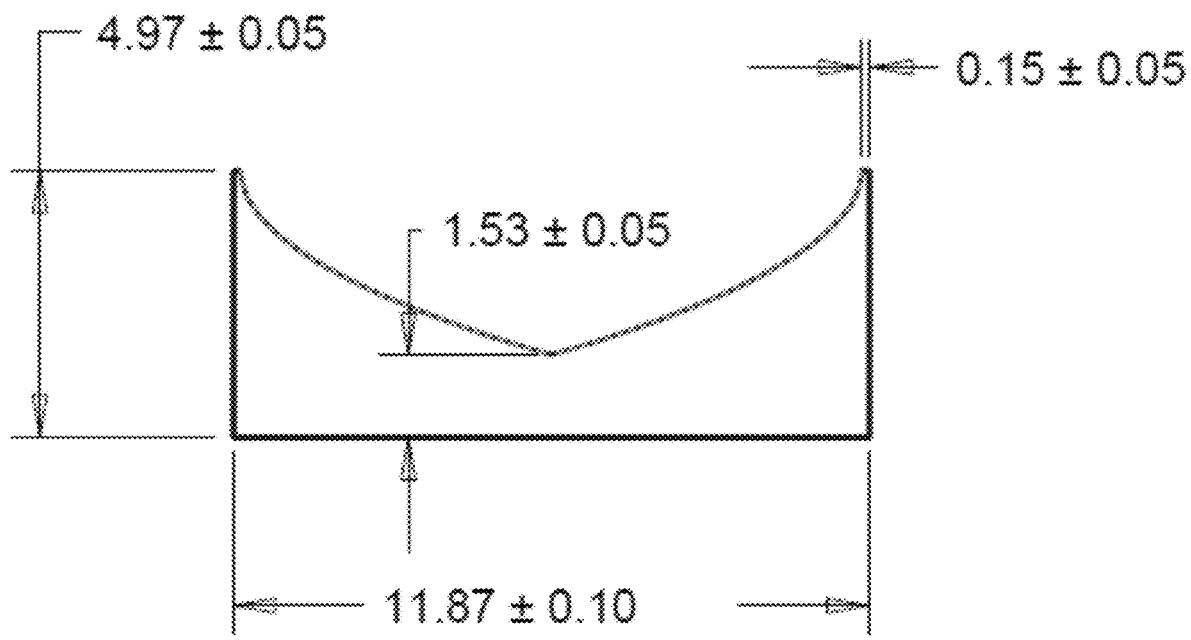
FIG. 31 schematically illustrates a power law ABH prototype sensor formed as described further herein.
Figure 32:
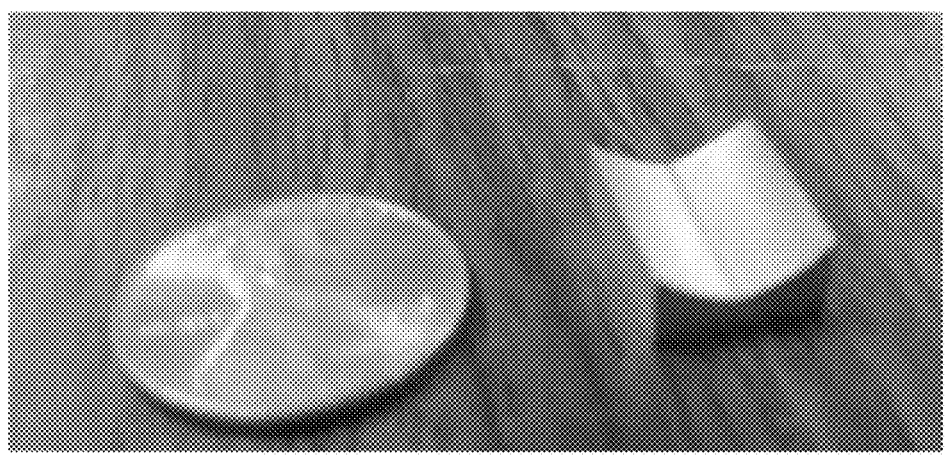
FIG. 32 illustrates a prototype power law ABH sensor as described herein.

A prototype of the power law ABH sensor was formed as illustrated in FIG. 31 (dimensions in mm). A long rectangular piece of aluminum 7075 was used as a base, and a power law was created using a 3-axis CNC mill. During the fabrication process, 2 mm was initially left overhanging on each side for tip thickness. Four individual sensors were cut from the piece of aluminum using a band saw and the sides milled flat with a vertical mill. The ABH tips were then created by milling them in 0.005 inch increments until the first pass where the flat of the tip was completely removed. An exemplary power law ABH sensor is illustrated in FIG. 32.

Figure 33:
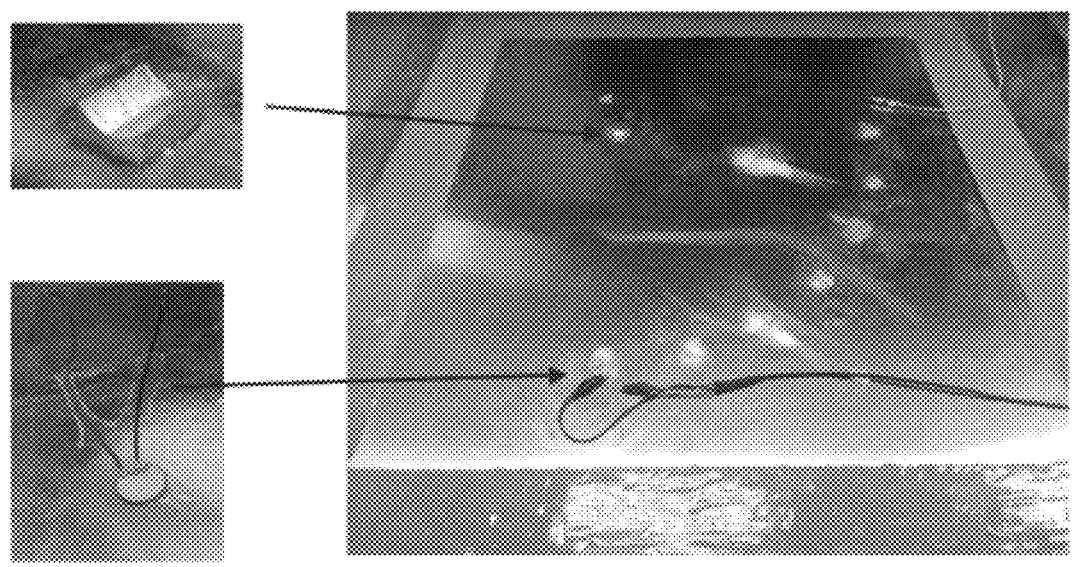
FIG. 33 illustrates a Lamb wave directional experimental set-up using an ABH sensor as illustrated in FIG. 32.
Figure 34:
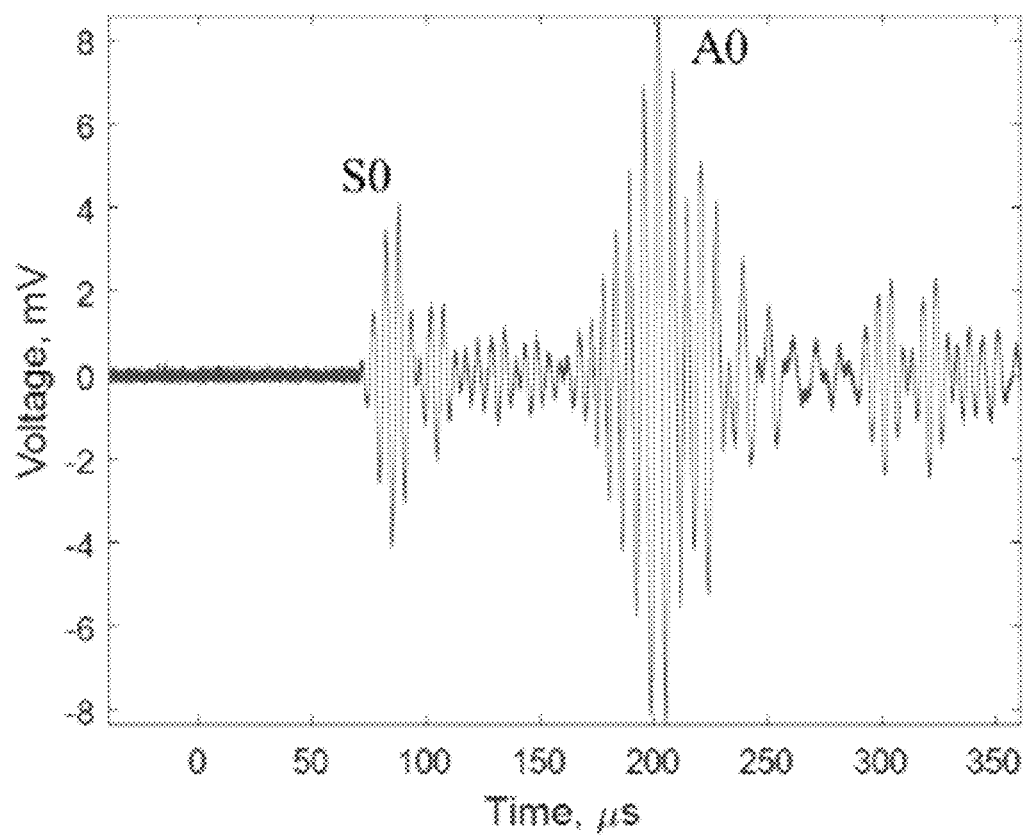
FIG. 34 illustrates an ABH sensor response to a 300 kHz tone burst.

The Lamb wave response of the prototype power law ABH sensor was tested on a 1 mm aluminum 2024-T3 plate substrate. This experiment was performed to evaluate two effects: 1) The influence of incident wave directionality on the ABH sensor response and 2) The capability of the ABH sensor to detect both in-plane and out-of-plane motion PWAS were arranged in 15° increments at a distance 400 mm away. The distance was increased from 150 mm in the last Lamb wave experiments to 400 mm since ringing from the S0 Lamb wave mode response would spill over the A0 mode if there was not sufficient separation time (FIG. 33). A pitch-catch was performed using each PWAS in turn, transmitting a 300 kHz 50 Vpp 3-count Hanning windowed tone burst. FIG. 34 shows the response from the 0° PWAS (oriented along the longitudinal axis of the ABH FBG). A clear S0 and A0 mode are distinguishable. This validates the hypothesis that the single-point bonded ABH FBG sensor possesses both dual in-plane and out-of-plane sensitivity.

Figure 35:
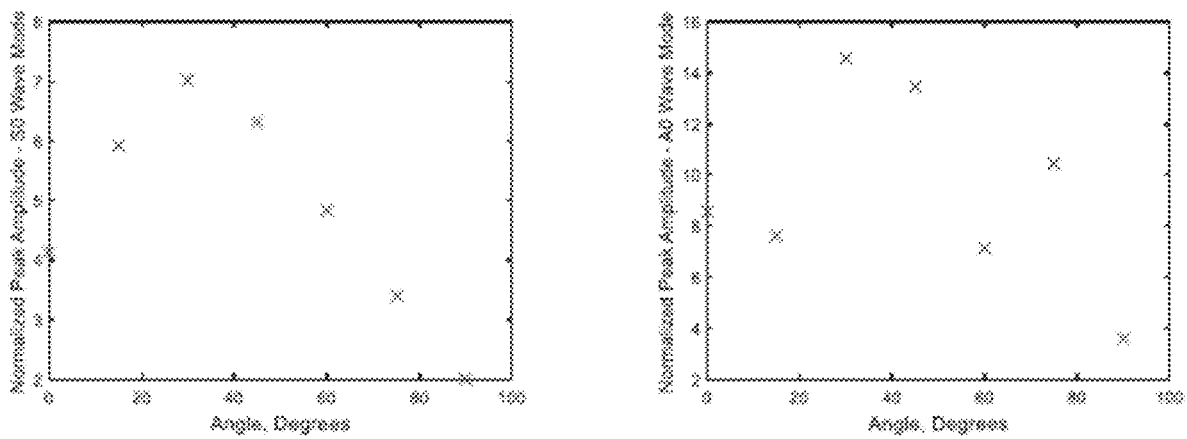
FIG. 35 illustrates the angular response of an ABH sensor to S0 wave mode (left), and A0 wave mode (right).

Averaging was used to reduce the noise of the waveform. The peak amplitude associated with each S0 and A0 wave mode was calculated and plotted as shown in FIG. 35 (S0 wave mode, left and A0 wave mode, right). Surprisingly, the S0 wave mode was a maximum at 30 degrees. The A0 wave mode was also not flat or nearly flat, as would be expected. This can be explained in the context of the aperture effect caused by the finite dimensions of the sensor base. At this frequency in this specimen, the S0 wave mode had a wavelength of approximately 15 mm. This is very close to the width and depth of the ABH sensor, such that the wave would be largely tuned out. Therefore, the directional effect was highly affected by the projection of the sensor length along the direction of wave propagation. As the angle got closer to 90° off the ABH FBG axis, there was the added effect that the ABH sensor was only predicted to be sensitive to in-plane waves from this direction due to Poisson effects. The sharp drop in amplitude for A0 waves transverse to the FBG axis indicates that this may have been the case. Similarly, the A0 wave mode had a wavelength of approximately 5 mm, smaller than the sensor length. This explains the seemingly chaotic behavior in the ABH sensor direction response to the A0 wave mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring the health of a structure comprising:
   a sensor comprising a base configured for attachment to a structure, the sensor comprising an acoustic black hole, the acoustic black hole comprising a taper that terminates in an edge, wherein the taper extends from the base such that the edge is at a distance from the structure; and
   a motion detector in communication with the edge of the acoustic black hole, the motion detector being configured to register vibrational motion of the edge of the acoustic black hole upon excitation of the sensor.

2. The system of claim 1, wherein the sensor comprises multiple acoustic black holes.

3. The system of claim 2, wherein two or more of the acoustic black holes are aligned with one another.

4. The system of claim 2, wherein two or more of the acoustic black holes are oriented with different alignments as compared to one another.

5. The system of claim 1, wherein the edge of the acoustic black hole is an essentially one dimensional edge.

6. The system of claim 1, wherein the edge of the acoustic black hole is an essentially two dimensional edge.

7. The system of claim 1, wherein the motion detector is an optical detector.

8. The system of claim 1, wherein the motion detector is a capacitive or inductive detector.

9. The system of claim 1, wherein the motion detector is a non-contact detector.

10. The system of claim 1, comprising multiple sensors.

11. The system of claim 1, further comprising a transducer in mechanical communication with the sensor, the transducer being configured to transmit an excitation signal to the sensor.

12. The system of claim 1, further comprising a data acquisition system.

13. A method for monitoring the health of a structure comprising:

monitoring a sensor attached to a surface of the structure, the sensor comprising a base that is attached to the surface and an acoustic black hole, the acoustic black hole comprising a taper that terminates in an edge, wherein the taper extends from the base such that the edge is at a distance from the structure, the monitoring including detecting vibrational motion of the edge of the acoustic black hole.

14. The method of claim 13, wherein the detecting is carried out by use of a non-contact motion detector.

15. The method of claim 13, the sensor comprising multiple black holes, the method comprising detecting vibrational motion of the multiple black holes.

16. The method of claim 15, the method further comprising comparing the detected vibrational motion of the multiple black holes and thereby determining one or more characteristics of an excitation wave.

17. The method of claim 16, wherein the characteristics comprise the in-plane and out-of-plane components of the excitation wave.

18. The method of claim 16, wherein the characteristics comprise the speed and/or direction of the excitation wave.

19. The method of claim 13, the method further comprising transmitting an excitation signal to the sensor.

* * * * *